US005478444A

United States Patent [19]

Liu et al.

[11] Patent Number: 5,478,444
[45] Date of Patent: Dec. 26, 1995

[54] COMPOSITE MIXED IONIC-ELECTRONIC CONDUCTORS FOR OXYGEN SEPARATION AND ELECTROCATALYSIS

[75] Inventors: Meilin Liu, Norcross, Ga.; Ashok V. Joshi; Yousheng Shen, both of Salt Lake City, Utah; Kevin Krist, Palatine, Ill.; Anil V. Virkar, Salt Lake City, Utah

[73] Assignee: Gas Research Institute, Chicago, Ill.

[21] Appl. No.: 146,880

[22] Filed: Nov. 1, 1993

Related U.S. Application Data

[63] Continuation-in-part of Ser. No. 882,175, May 11, 1992, Pat. No. 5,273,628.
[51] Int. Cl.$^6$ .............................. C25B 1/02; C25B 13/04
[52] U.S. Cl. ................... 204/59 R; 204/295; 252/518; 252/519; 252/520; 252/521; 429/33
[58] Field of Search .................................. 204/295, 59 R; 252/518, 519, 520, 521; 501/103, 123, 126, 134, 152; 429/33

[56] References Cited

U.S. PATENT DOCUMENTS

| | | | |
|---|---|---|---|
| 3,956,194 | 5/1976 | Armand | 252/507 |
| 4,528,083 | 7/1985 | LaConti et al. | 204/290 R |
| 4,793,904 | 12/1988 | Mazanec et al. | 204/59 R |
| 4,802,958 | 2/1989 | Mazanec et al. | 204/80 |
| 4,812,329 | 3/1989 | Isenberg | 427/115 |
| 4,931,214 | 6/1990 | Worrell et al. | 252/520 |
| 4,933,054 | 6/1990 | Mazanec et al. | 204/80 |
| 5,006,494 | 4/1991 | Virkar | 501/152 |
| 5,306,411 | 4/1994 | Mazanec et al. | 204/265 |

FOREIGN PATENT DOCUMENTS 0399194  5/1990  European Pat. Off. .

OTHER PUBLICATIONS

M. J. Verkerk and A. J. Burggraaf, "High Oxygen Ion Conduction in Sintered Oxides of the Bi2O3-Dy2O3 System", J. Electrochem. Soc., 128, No. 1, 75–82 (1981); No month available.

P. J. Dordor, J. Tanaka and A. Watanabe, "Electrical Characterization of Phase Transition In Yttrium Doped Bismuth Oxide, Bi1.55Y0,45O3", Solid State Ionics, 25, 177–181, (1987); No month available.

H. T. Cahen, T. G. M. Van Den Belt, J. H. W. De Wit and G. H. J. Broers, "The Electrical Conductivity of –Bi2O3 Stabilized By Isovalent Rare-Earth Oxides RO23", Solid State Ionics, 1, 411–423, (1980); No month available.

H. T. Cahen, J. H. W. De Wit, A. Honders, G. H. J. Broers and J. P. M. Van Den Dungen, "Thermogalvanic Power And Fast Ion Conduction In –Bi2O3 And —(Bi2O3)1–x(R3O2)x With R=Y, Tb–Lu", Solid State Ionics, 1, 4250440, (1980); No month available.

H. Iwahara, T. Esaka, T. Sato and T. Takahashi, J., "Formation of High Oxides Ion Conductive Phases in the Sintered Oxides of the System Bi2O3–La2)3 System Bi2O3–Ln2O3 Ln=La–Yb)", Solid State Chem., 39, 173–180, (1981); No month available.

M. J. Verkerk and A. J. Burggraaf, "High Oxygen Ion Conduction In Sintered Oxides Of The Bi2O3–La2O3 System", Solid State Ionics, 3/4, 463–467, (1981) No month available.

Primary Examiner—Kathryn Gorgos

[57] ABSTRACT

A composite ceramic mixed oxygen ion and electronic conducting materials having high ambipolar activity which can be fabricated into thin membranes for high efficiency oxygen separation from air at intermediate temperatures. The mixed conducting materials have composite non-homogeneous microstructures of a separate predominantly oxygen ion conductive phase and a predominantly electronic conductive phase. Predominantly oxygen ion conducting phases include bismuth, cerium and thorium oxide based materials and predominantly electronic conducting phases include at least one metal, metal oxide of at least one metal, and at least one perovskite-type electronic conductor material.

31 Claims, 11 Drawing Sheets

COMPOSITE MIXED IONIC-ELECTRONIC CONDUCTORS FOR OXYGEN SEPARATION AND ELECTROCATALYSIS

This application is a continuation in part of copending application Ser. No. 07/882,175, filed May 11, 1992, now U.S. Pat. No. 5,273,628.

BACKGROUND OF THE INVENTION

Field of The Invention

This invention relates to composite materials which may be fabricated in membrane form and have both high ionic and electronic conductivity. The mixed conducting materials of this invention are useful as an oxygen permeation electrolyte material, for pressure driven oxygen separation, and as electrode materials for oxygen exchange reactions.

Description of Related Art

Much prior work has centered around stabilizing and increasing oxygen ion conduction of materials such as $Bi_2O_3$. High oxygen ion conduction compared to that of zirconia based electrolytes has been obtained using $Bi_2O_3$ doped with $Er_2O_3$ or $Tm_2O_3$, M. J. Verkerk and A. J. Burggraaf, *J. Electrochem. Soc.*, 128, No. 1, 75–82 (1981), and using $Bi_2O_3$ doped with yttrium, P. J. Dordor, J. Tanaka and A. Watanabe, *Solid State Ionics*, 25, 177–181, (1987), and using $Bi_2O_3$ doped with $Yb_2O_3$, H. T. Cahen, T. G. M. Van Den Belt, J. H. W. De Wit and G. H. J. Broers, *Solid State Ionics*, 1, 411–423, (1980). Increasing oxygen ion conductivity and structural stabilization of the FCC phase of $Bi_2O_3$ based electrolytes has been investigated resulting in fast ion conduction in $Bi_2O_3$ doped with oxides of Y and Tb—Lu, H. T. Cahen, J. H. W. De Wit, A. Honders, G. H. J. Broers and J. P. M. Van Den Dungen, *Solid State Ionics*, 1, 4250440, (1980), and $Bi_2O_3$ doped with oxides of La, Nd, Sm, Dy, Er or Yb, H. Iwahara, T. Esaka, T. Sato and T. Takahashi, *J. Solid State Chem.*, 39, 173–180, (1981), and $Bi_2O_3$ doped with oxides of Er and Dy, M. J. Verkerk and A. J. Burggraaf, *Solid State Ionics*, 3/4, 463–467, (1981). U.S. Pat. No. 5,006,494 teaches oxygen ion conductivity of $Bi_2O_3$ in the cubic form stabilized by 10–40 mole percent of a rare earth oxide such as yttria is greatly enhanced by inclusion of up to 10 mole percent of an oxide of a cation having a valence of 4 or greater, such as zirconia, hafnia, thoria, stannic oxide, tantalum oxide, and niobium oxide.

Mixed ionic-electronic conductors have been disclosed as solid electrolyte materials and for electrocatalysis: U.S. Pat. No. 4,793,904 teaches conversion of light hydrocarbons to synthesis gas using a solid electrolyte having a conductive metal or metal oxide coating on the cathode side which is capable of reducing oxygen to oxygen ions and a conductive coating on the anode side capable of catalyzing the oxidative conversion of methane or natural gas to synthesis gas with the solid electrolyte being a high ionic conductive material, preferably yttria or calcia stabilized zirconia, while also disclosing $Bi_2O_3$ stabilized by a lanthanide or calcium oxide; U.S. Pat. No. 4,933,054 teaches electrocatalytic oxidative conversion of saturated hydrocarbons to unsaturated hydrocarbons in an electrogenerative cell using a solid electrolyte having a conductive coating on each side, teaching the coating on anode side may be bismuth and preferably mixtures of silver and bismuth, with the solid electrolyte being a high ionic conductive material, preferably yttria or calcia stabilized zirconia, while also disclosing $Bi_2O_3$ stabilized by a lanthanide or calcium oxide; U.S. Pat. No. 4,802,958 teaches electrocatalytic conversion of low molecular weight hydrocarbons to higher molecular weight hydrocarbons in an electrogenerative cell using a solid electrolyte coated with a metal or metal oxide coating on each side as taught in the '054 patent, the conductive metal or metal oxide coating on the cathode side being one capable of reducing oxygen to oxygen ions and the conductive metal or metal oxide coating on the anode side being capable of catalyzing the conversion of low molecular weight hydrocarbons to higher molecular weight hydrocarbons including bismuth and preferably mixtures of bismuth and silver; and U.S. Pat. No. 4,812,329 teaches a coating of oxygen-ionic-electronic conducting cerium and uranium oxide undoped or, preferably, doped with zirconia, thoria, or lanthanum oxides on cermet electrodes to provide electronic conduction for solid oxide electrochemical cells European Patent Publication No. 0 399 833 teaches multi-phase mixtures of an electronically conductive material and an oxygen ion conductive material and solid membranes based upon $ABO_3$ perovskite materials, preferably containing small amounts or no bismuth.

Mixed ionic and electronic conducting oxidic materials based upon 25 to 98mole percent cubic or tetragonal $ZrO_2$, 1.5 to 15 mole percent stabilizing oxide of alkaline earth metals, yttrium and/or rare earth metals, particularly oxides of Ca, Mg, Y, and 0.5 to 50 mole percent oxide V, Nb, Ta, Cr, Mb, W and/or Ti with usual impurities are taught by U.S. Pat. No. 4,931,214 to provide high current densities, operate at lower temperatures than present materials, provide conductivity independent of oxygen pressure and are useful in oxygen concentration cells, oxygen probes, fuel cells, and electrolysis cells. U.S. Pat. No. 3,956,194 teaches mixed electronic and ionic conductors for positive electrodes of electrochemical generators which are monophased graphite material having an alkali cation of Li, Na, K, Rb, Cs, or $NH_4$, a transition metal of Ti, V, Cr, Mn, Fe or Mo, and a non-metallic electronegative atom of O, S, F, Cl or Br.

SUMMARY OF THE INVENTION

This invention relates to composite materials having high ambipolar conductivity at desired process temperatures. Ambipolar conductivity, which has a strong influence on the rate of oxygen separation, depends upon the correct combination of ionic and electronic conductivity to result in high ambipolar conductivity, as more fully described in M. Liu, Electrode Kinetics and Transport Properties of Mixed Ionic-Electronic Conductors, Proceedings of the First International Symposium on Ionic and Mixed Conducting Ceramics, Edited by T. A. Ramanarayanan and H. L. Tuller, Proc. Vol. 91-12, 191–215, *The Electrochemical Society*, Pennington, N.J., (1991) incorporated herein in its entirety by reference.

Prior materials used in oxygen separation have been electrolyte materials, such as yttrium stabilized zirconia or ceria with $CaF_2$ fluorite structure, which are predominantly oxygen ion conductors. In electrolytes of such predominantly ionic conducting materials, oxygen transport takes place on the predominantly ionic conducting electrolyte while electrons move through an external electron circuit to maintain electrical neutrality. Thus, in addition to electrolyte materials such a prior device required two electrodes as well as an external connection between the electrodes, for example, porous platinum electrode layers and platinum wire leads, both operating at high temperatures. An oxygen semipermeation separation device according to the present invention based on a mixed ionic-electronic conduction composite electrolyte membrane eliminates the two porous electrodes and external electron circuit.

Solid oxygen ion conducting electrolytes based on zirconium oxide or cerium oxide have been used, but require relatively high operating temperatures of about 1,000° C. since oxygen ionic conductivity of these materials becomes significant only at high temperatures, such as about 0.1 S/cm total electrical conductivity at 1,000° C. for yttria stabilized zirconia. Bismuth oxide has an electrical conductivity of higher than 0.33 S/cm at 750° C. which is much higher than zirconium oxide or cerium oxide at that temperature. Use of ionic-electronic mixed conducting materials based on bismuth oxide as an electrolyte, according to this invention, permits the operating temperature of an oxygen separation device to be at markedly lower temperatures than prior zirconium oxide or cerium oxide based materials.

It is one object of this invention to provide mixed oxygen ion and electronic conducting materials of composite non-homogeneous microstructure including an ionic conductor based upon bismuth, thorium or cerium oxide.

It is an object of this invention to provide mixed oxygen ion and electronic conducting bismuth oxide based materials having higher ambipolar conductivity and lower temperature operation than previously available materials.

It is another object of this invention to provide mixed oxygen ion and electronic conductors as a bismuth oxide based composite non-homogeneous microstructure of a separate substantially continuous oxygen ion conductive phase and an electronic conductive phase.

It is still another object of this invention to provide a bismuth oxide based mixed oxygen ion and electronic conductor membrane for high efficiency separation of oxygen from mixed gases, such as air.

It is yet another object of this invention to provide a mixed oxygen ion and electronic conducting bismuth oxide based material having high ambipolar conductivity for use in fuel cells, sensors, co-generation systems, electrosynthesis, and other solid state electrochemical processes utilizing mixed oxygen ion and electronic conduction.

Mixed oxygen ion and electronic conducting composite materials suitable for use in this invention include non-homogeneous mixed microstructures of about 5 to about 95, preferably about 50 to about 95, volume percent predominantly oxygen ion conductor selected from $Bi_2O_3$ based, $CeO_2$-based, $ThO_2$-based ionic conductor material, and mixtures thereof and about 5 to about 95, preferably about 5 to about 50, volume percent predominantly electronic conductor selected from at least one metal, metal oxide of at least one metal, at least one perovskite-type electronic conductor material, and mixtures thereof. By the terminology "at least one metal" as used throughout this description and claims we mean to include a single metal, an alloy, and mixtures of a plurality of metals and alloys.

We have found that mixed oxygen ion and electronic conducting bismuth oxide based materials with high ionic and electronic conductivity, which are preferred for oxygen separation at intermediate temperatures, comprise a composite non-homogeneous mixed microstructure of a substantially continuous predominantly oxygen ion conducting bismuth oxide based phase of about 30 to about 99 mole percent and a substantially continuous predominantly electronic conducting phase of about 1 to about 70 mole percent of at least one metal oxide, or at least one perovskite material and/or about 50 to about 95 volume percent of oxygen ion conducting bismuth oxide based phase and about 5 to about 50 volume percent of at least one metal, and mixtures thereof electronically conductive and chemically inert to the oxygen ion conducting bismuth oxide based phase.

The mixed oxygen ion and electronic conducting composite materials of this invention may be fabricated into gas impervious membranes for oxygen ion transport. These mixed oxygen ion and electronic conducting gas impervious membranes have high ambipolar conductivity for oxygen ion transport and are useful for oxygen separation from an oxygen containing gas by contacting one side of the membrane with an oxygen containing gas concurrently with withdrawing oxygen from the second opposite side of the membrane. Oxygen separation from gas mixtures using mixed oxygen ion and electronic conducting bismuth oxide based or cerium oxide based membranes can be achieved at relatively low pressure differentials and intermediate temperatures providing enhanced separation efficiency and reduced operating costs. High ambipolar conductivity and high catalytic activity of these materials render them especially suitable for catalysis of electrochemical reactions, electrosynthesis and electrolysis applications.

BRIEF DESCRIPTION OF THE DRAWINGS

The above and further objects and advantages of the invention will become apparent upon reading the detailed description of preferred embodiments and reference to the drawings, wherein.

DESCRIPTION OF PREFERRED EMBODIMENTS

Figure 1:
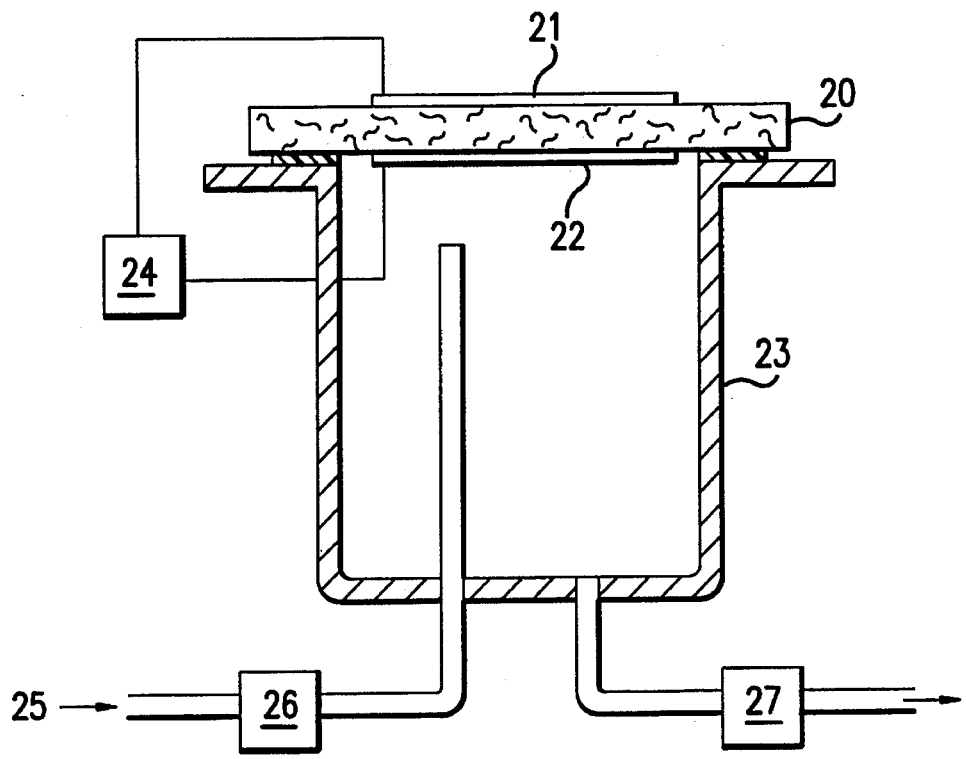
FIG. 1 is a schematic showing of an apparatus for measurement of permeation current of a membrane according to this invention.

Mixed oxygen ion and electronic conducting materials resulting from combination of materials having oxygen ion and electronic conductivity in a manner which results in high ambipolar conductivity at desired process temperatures are achieved by this invention. The ambipolar conductivity, or the ambipolar diffusivities of oxygen in the mixed oxygen ion and electronic conducting bismuth oxide based materials of this invention are more than two times, and generally more than ten or a hundred times, greater than mixed oxygen ion and electronic conductors reported in the prior literature. The ambipolar conductivity in $Ohm^{-1}cm^{-1}$ at 750° C. for bismuth oxide based $Bi_{1.5}Y_{0.3}Cu_{0.2}O_3$ is $7\times10^{-2}$ and for $(Bi_{1.5}Y_{0.5}O_{3-\delta})_{90\ vol.}(Ag)_{10\ vol.}$ is $6.7\times10^{-2}$ while much lower values obtained under similar conditions have been reported for mixed conductors in the literature: $La_{0.89}Sr_{0.1}MnO_{3-\delta}$ is $5\times10^{-4}$; $La_{0.5}Sr_{0.5}MnO_{3-\delta}$ is $3\times10^{-3}$; and $La_{0.2}Sr_{0.5}Co_{0.8}Fe_{0.2}O_{3-\delta}$ is $3\times10^{-2}$. W. L. Worell, Electrical Properties of Mixed-conducting Oxides Having High Oxygen-ion Conductivity, *Solid State Ionics*, Elsevier Science Publishers B.V. (1992) It is desired that the mixed oxygen ion and electronic conducting material of this invention have ambipolar conductivities of greater than about $5\times10^{-2}\ Ohm^{-1}cm^{-1}$ at about 750° C.

Suitable mixed oxygen ion and electronic conducting metal oxide based materials having high ambipolar conductivity according to this invention include non-homogeneous mixed microstructure materials of about 5 to about 95 volume percent predominantly oxygen ion conducting metal oxide and about 5 to about 95 volume percent predominantly electronic conducting metal, metal oxide and perovskite-type metal oxides.

Suitable oxygen ion conducting metal oxides include those of the formulation $Bi_{2-x-y}M'_xM_yO_{3-\delta}$, $Ce_{2-x-y}M'_xM_yO_{2-\delta}$, and $Th_{2-x-y}M'_xM_yO_{2-\delta}$ wherein M' is a stabilizer selected from the group consisting of Er, Y, Tm, Yb, Lu, Nd, Sm, Dy, Zr, Hf, Th, Ta, Nb, Pb, Sn, In, and mixtures thereof; M is a dopant selected from the group consisting of Cu, Ti, V, Cr, Mn, Fe, Co, Ni, and mixtures thereof; x is a positive number of about 0.30 to about 0.30; y is a number of 0 to about 0.10; and $\delta$ is a number to satisfy valence requirements. In preferred embodiments, M' is selected from the group consisting of Er, Y, Dy and mixtures thereof; and M is selected from the group consisting of Cu, Ti, Fe and mixtures thereof.

The electronic conducting phase can be at least one metal selected from Ag, Ir, Pd, Pt and Au; an electronically conductive metal oxide of $CrO_2$, $IrO_2$, $MnO_2$, $MoO_2$, $OsO_2$, $ReO_2$, $RhO_2$, $RuO_2$, $WO_2$, $Bi_{2-y'}M_{y'}O_{3-\delta}$, wherein y' is a numeral of about 0.40 to about 2.0 and M and $\delta$ have the meanings defined above, and mixtures thereof; or an electronically conductive perovskite material selected from $La_{1-z}Sr_zCoO_{3-\delta}$, $La_{1-z}Sr_zMnO_{3-\delta}$, $La_{1-z}Sr_zMn_{1-w}Co_wO_{3-\delta}$, $La_{1-z}Sr_zCo_{1-w}Fe_wO_{3-\delta}$, $SrFe_{1-z}Co_zO_{3-\delta}$, $VTiO_3$, $LaTiO_3$, $SrFeO_3$, $SrRuO_3$, $LaNi_{1-z}Co_zO_{3-\delta}$, derivative forms and mixtures thereof wherein z is a positive numeral of about 0.01 to about 0.8; w is a positive numeral of about 0.01 to about 0.8; and $\delta$ is a number of 0 to a positive or negative number of about 0.3 to satisfy valence requirements. By the terminology "derivative forms" we to include the above perovskite materials which have been modified by adding a small amount of additional additives or dopants while maintaining the original structure. In preferred embodiments, z is a positive numeral of about 0.05 to about 0.2 and w is a positive numeral of about 0.05 to about 0.2. Preferred electronic conducting phase materials include $Bi_{2-y'}M_{y'}O_{3-\delta}$ wherein y' is about 0.40 to about 1.0.

Suitable mixed oxygen ion and electronic conducting bismuth oxide based materials having high ambipolar conductivity according to this invention are non-homogeneous mixed microstructure materials comprising about 30 to about 99 mole percent of a substantially continuous predominantly oxygen ion conducting bismuth oxide based phase, as defined above, and about 1 to about 70 mole percent of a substantially continuous predominantly electronic conducting phase selected from at least one metal oxide, at least one perovskite type material and mixtures thereof, as defined above, and/or about 50 to about 95 volume percent oxygen ion conducting bismuth oxide based phase, as defined above, and about 5 to about 50 volume percent of at least one metal, as defined above, the electronic conducting phase being substantially chemically inert to the oxygen ion conducting bismuth oxide based phase. In other preferred embodiments using a metal or alloy electronic conducting phase, the oxygen ion conducting bismuth oxide phase is present in about 70 to about 80 volume percent and the electronic conducting phase is present in about 20 to about 30 volume percent. In other preferred embodiments, the oxygen ion conducting bismuth oxide phase is about 60 to about 95 mole percent and the electronic conducting phase is about 5 to about 40 mole percent.

In one preferred embodiment, both the oxygen ion conducting phase and the electronic conducting phase are bismuth oxide based. The oxygen ion conducting phase is about 60 to about 95 mole percent, preferably about 75 to about 90 mole percent, and the electronic conducting phase is about 5 to about 40 mole percent, preferably about 10 to about 25 mole percent, of the total mixed, composite structure. The oxygen ion conducting phase is about 70 to about 90 mole percent, preferably about 60 to about 80 mole percent, cubic or tetragonal $Bi_2O_3$; about 10 to about 30 mole percent, preferably about 15 to about 30 mole percent, oxide of Y, Er or Dy, stabilizing the $Bi_2O_3$; and 0 to about 10 mole percent, preferably about 0.05 to about 2 mole percent oxide of Cu, Ti or Fe, including the usual impurities, dopant creating ionic and electronic defects in the $Bi_2O_3$. The electronic conducting phase is about 0 about 80 mole percent, preferably about 40 to about 60 mole percent, $Bi_2O_3$ and about 20 to about 100 mole percent, preferably about 20 to about 60 mole percent, of an oxide of Ti, Cu or Fe. The electronic conducting phase has the formula $Bi_2CuO_4$, which is predominantly an electronic conductor. This phase is distributed along grain boundaries of the oxygen ion conducting phase and is continuous. The ratio of the ionic to electronic conductivity of the mixed conducting materials according to this invention may be adjusted to desired levels for practical applications, such as a 1:1 ratio when the mixed ionic electronic conducting composite material is used as an oxygen semipermeation electrolyte membrane.

Figure 14:
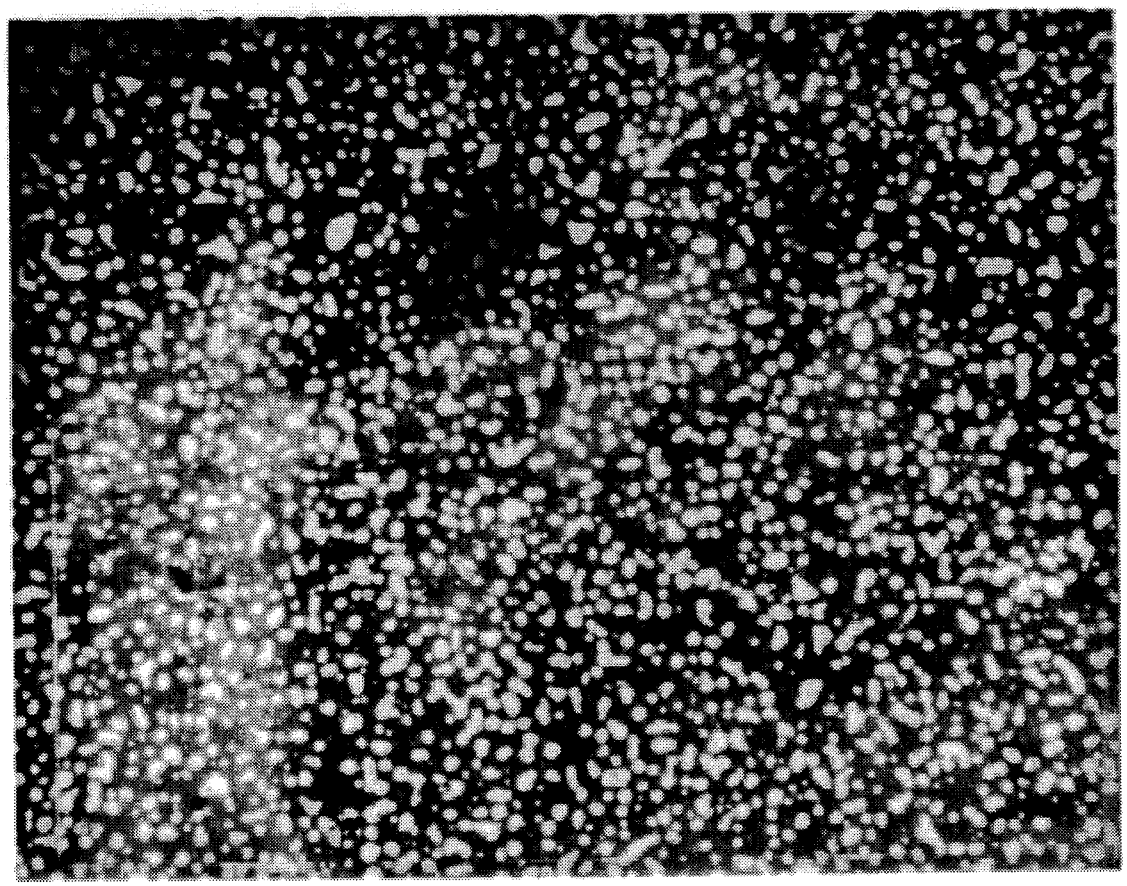
FIG. 14 is a photomicrograph of a non-homogeneous mixed microstructure ceramic material as prepared in Example III.

The microstructure of the composite non-homogeneous mixed material should have uniform distribution of the two phases, one being oxygen ion conductive and the other being electronically conductive. Each phase should be substantially continuous and be made up of particles with diameters of less than about 2 microns. The two phases are desirably substantially chemically inert to each other and no other phases are present at the phase boundaries or elsewhere in the composite. FIG. 14 is a photomicrograph of the mixed microstructure $(Bi_{1.5}Y_{0.5}O_{3-\delta})_{90\ vol.}$ and $Ag_{10\ vol.}$ sintered at 780° C. showing the bismuth oxide based matrix phase as dark and the secondary silver phase as light.

The composite materials of this invention may be produced by various methods known to the art. One method of production is mixing desired proportions of oxide of bismuth and oxide of yttrium and calcining at sufficiently high temperature and for sufficient time to obtain yttria-stabilized bismuth oxides which may be verified by x-ray diffraction. The yttria-stabilized bismuth oxides calcined powder is mixed with the desired volume percentage of $Ag_2O$ powder and ball-milled down to a particle size of about 0.5 to about 1 micron. A slurry is formed to which organic binder may be added and mixed by milling followed by drying. The powder may be screened through a #60 mesh screen and formed into desired shape by pressing. Another method is to tape cast the slurry of fine ceramic powder into films or membranes. The green material is then sintered in air at a sufficiently high temperature and for a sufficiently long time to result in a density of greater than about 95% of the theoretical value to avoid appreciable passage of molecular sized material through the membrane. The mixed oxygen ion and electron conducting gas impervious membranes of this invention may also be produced by chemical vapor deposition, electrochemical vapor deposition, sol-gel processing, precipitation processing, or by other suitable processes.

Mixed oxygen ion and electron conducting gas impervious membranes having a thickness of about 1 to about 2000 microns, preferably about 1 to about 1000 microns and most preferably about 1 to about 50 microns, may be formed having the non-homogeneous microstructure described above. By the term "membranes", we mean to include a variety of forms, such as, thin sheets, wafers, and the material formed into any desired shape, such as pellets, tubes, honeycombs, and the like for use in a wide variety of apparatus for oxygen separation and for catalysis.

When the composite mixed ionic-electronic conducting materials of this invention are used for electrolytes in pressure activated oxygen separation devices, good results are obtained in the intermediate temperature range of about 600° C. to about 750° C. We have found that, in the use of bismuth oxide based mixed ionic-electronic conducting electrolytes according to this invention, the oxygen transport, by the oxygen semipermeation from the cathode side to the anode side of the mixed conducting electrolyte, has been recorded after an oxygen partial pressure gradient has been built up across the mixed conducting electrolyte. Higher oxygen exchange current density will be achieved when the thickness of the mixed conducting electrolyte is reduced and the electrocatalysis is improved. Therefore, electrolytes produced from mixed ionic-electronic conducting of the present invention produce a substantially more uninhibited incorporation and transport of oxygen ions from the cathode side to the anode and release of oxygen from the anode side of the mixed conducting electrolyte while electrons are spontaneously transported from the anode to the cathode side of the electrolyte without an external electrical circuit. When the mixed ionic-electronic conducting material of this invention is used as an electrode in an electrochemical device, the incorporation of oxygen and electron exchange can take place on any boundaries between the two phase, solid mixed conductor and gas, contact areas. In comparison, in electronic conducting electrodes commonly used the charge transfer only takes place on the uni-dimensional boundary areas of the three phase contact of ionic conductor, electronic conductor, and gas. This offers advantages in use of the composite ionic-electronic conductors of this invention for oxygen exchange reactions, such as, in oxygen concentration cells, oxygen fuel cells, and electrolysis cells.

Since the incorporation of oxygen is catalytically activated by the introduction of electronic conduction in the electrolyte according to the present invention, the kinetics of oxygen reduction and evolution at the surfaces of the mixed ionic-electronic conducting electrolyte are even more favorable in comparison with the most commonly used expensive porous platinum which is often used as an electrode material in oxygen separation devices or other electrochemical devices where zirconium oxide or cerium oxide have been used as electrolytes. Using the mixed ionic-electronic conducting composite bismuth oxide based electrolyte of this invention, oxygen sensors, fuel cells, and electrolysis cells can be operated at lower temperatures than those previously required.

Oxygen permeation of a mixed oxygen ion and electronic conducting membrane can be computed from measurements obtained from an apparatus as shown schematically in FIG. 1. The apparatus is suitable for permeation measurement, potentiometry, impedance spectroscopy, and for partial conductivity measurement under the restricted condition ($\Delta\Phi=0$ and $\Delta\Phi=EN$). For permeation measurements, electrodes are not required, while for impedance measurements chemical potential gradient is not necessary. FIG. 1 shows gas impermeable vessel 23 with mixed oxygen ion and electronic conductor 20 sealed across its open end with a porous electrode 22 on one side facing the vessel and porous electrode 21 on the opposite side. Electrodes 21 and 22 are connected to potentiostat 24 for electrical measurements. Pressurized mixed gas containing oxygen is supplied by supply means 25 through oxygen analyzer and flow meter 26 to vessel 23. The outgoing gas stream from vessel 23 is measured by oxygen analyzer and flow meter 27. When a mixed oxygen ion and electronic conductor is exposed to a chemical potential gradient and the external circuit is open, the ambipolar diffusion current density is generally described by $$-j_e = j_{O=} = (\sigma_{amb}/L)[(RT/4F) \ln(Po_2/Po_2) - (\eta_a \eta_c)]$$

where the ambipolar conductivity is given by $$\tau_{amb} = [(\tau_{O=}\tau_e)/(\tau_{O=}+\tau_e)] + [(\tau_{=o=}-\tau_{o=})/(1-(\tau_{o=}'-\tau_{o=})/\tau_e)]$$

The ionic current (Amp.) flowing through the mixed conductor can be calculated from the observed molar flux of oxygen as follows $$I_{o=} = (v_2\chi_2 - v_1\chi_1)(298/T)(1/60)(1/24000)(4)(96500)$$

or $$I_{o=} = 85.59(v_2\chi_2 - v_1\chi_1)/T$$

where $v_1$ and $v_2$ are flow rates ($cm^3 min^{-1}$) of the incoming and outgoing gas stream, respectively, as measured at temperature T in Kelvin wherein $\chi_1$ and $\chi_2$ are the molar fraction of oxygen in the incoming and the outgoing gas stream, respectively. The bases for these calculations and the meanings of the symbols is set forth more completely in M. Liu and A. Joshi, *Characterization of Mixed-Ionic-Electronic Conductors, Proceedings of the First International Symposium on Ionic and Mixed Conducting Ceramics,* Edited by T. A. Ramanarayanan and H. L. Tuller, Proc. Vol. 91-12, 231–246, *The Electrochemical Society,* Pennington, N.J., (1991) incorporated herein in its entirety by reference.

Figure 2:
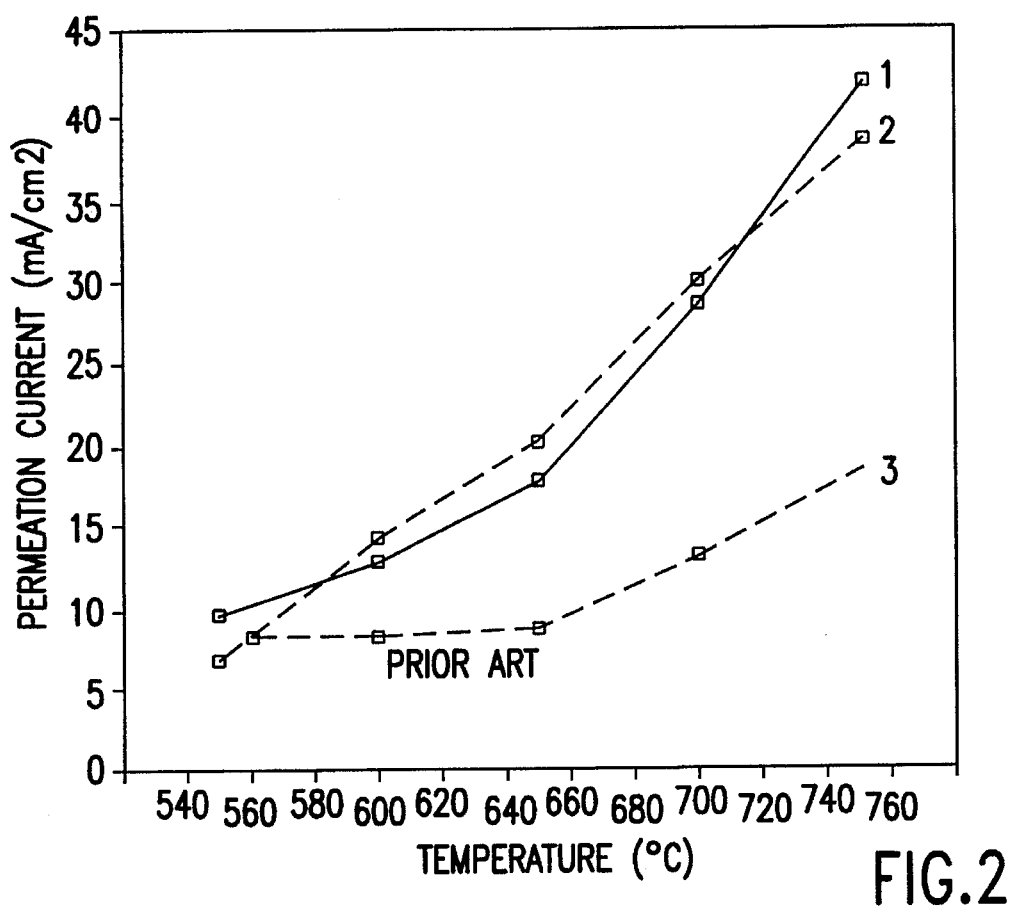
FIG. 2 is a graph comparing permeation current of membranes according to this invention with prior art materials.

FIG. 2 shows oxygen permeation rates obtained at specified temperatures with 5mm thick pellets of specified mixed ionic-electronic conducting materials using the apparatus as shown in FIG. 1 with silver electrodes. The material $La_{0.2}Sr_{0.5}Co_{0.5}Fe_{0.2}O_3$ while the line denoted as 1 was line denoted as 3 was obtained using a prior art perovskite obtained using the homogeneous microstructure material $Bi_{1.5}Y_{0.3}Cu_{0.2}O_{3-\delta}$ as claimed in the parent application and the line denoted as 2 was obtained using the non-homogeneous mixed microstructure material $(Bi_{1.5}Y_{0.5}O_{3-\delta})_{90 \ vol.}$ $(Ag)_{10 \ vol.}$ as claimed in the present application. Clearly, the oxygen permeation rates of the bismuth oxide based materials are much higher than prior art mixed conductors reported in the literature known to the inventors. This is the first time, known to the inventors, that significant electronic conductivity has been introduced to bismuth oxide based materials to form mixed oxygen ion and electronic conductive materials exhibiting high ambipolar conductivity.

Figure 3:
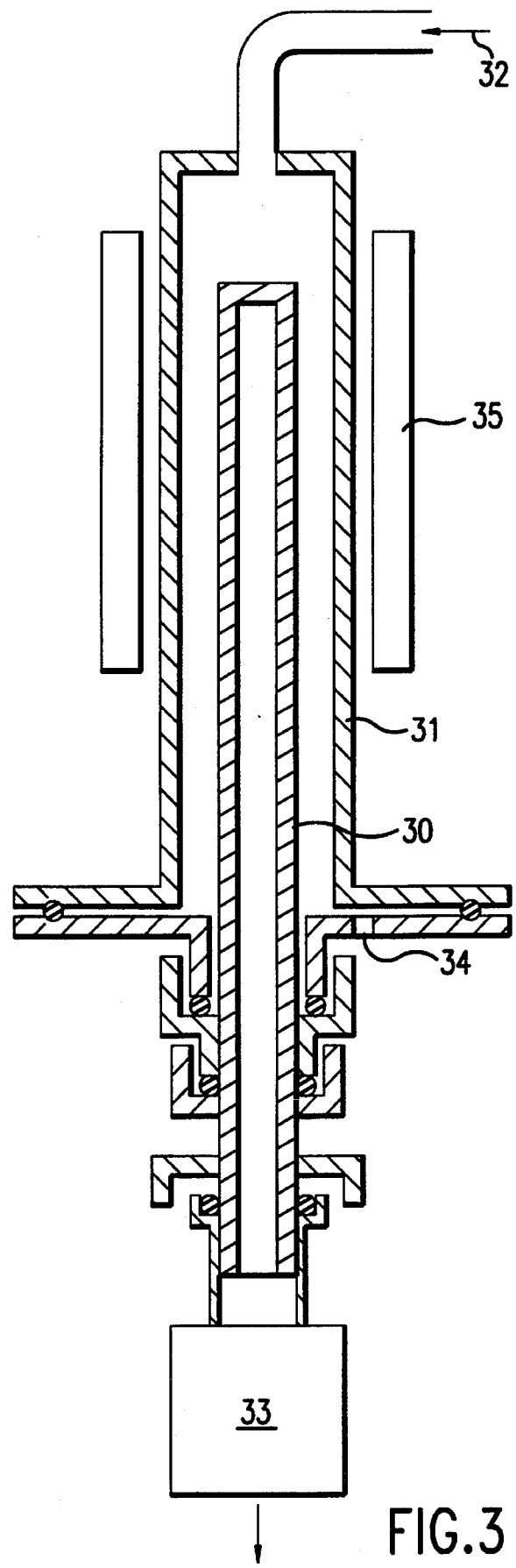
FIG. 3 is a schematic showing of an apparatus for measurement of oxygen separation from air through a membrane according to this invention.

FIG. 3 is a schematic showing of an apparatus for oxygen separation from a mixed gas containing oxygen. Tubular shaped mixed oxygen ion and electronic conductor 30 extends within gas tight vessel 31. Mixed gas containing oxygen, such as air, is supplied to vessel 31 from any appropriate supply means 32. The mixed gas is maintained under desired pressure of about 25 to about 200 psi, preferably about 70 to about 100 psi, and contacts one side of mixed oxygen ion and electronic conducting membrane 30 which is maintained by heating means 35 at a desired elevated temperature of about 300° C. to about 750° C., preferably about 500° C. to about 750° C. Oxygen is withdrawn from the compartment in contact with the opposite side of mixed oxygen ion and electronic conducting membrane 30 and may be withdrawn to any suitable oxygen volume and/or analyzer means 33. The compartment in contact with the opposite side of the mixed conducting membrane is maintained at about 1 to about 14 psia, preferably at about 1 to about 5 psia. It is recognized that oxygen molecules are ionized at the interface before entering into the membrane and are converted back to molecular oxygen at the opposite surface of the mixed conducting membrane and are withdrawn from the compartment in contact with the opposite surface as molecular oxygen. We have found it most satisfactory to locate the seals for sealing the mixed conductor shape within the vessel in the cold zone to reduce thermal expansion problems in the seal area. Suitable electrode leads 34, or other leads, to the interior of vessel 31 may be provided as desired by methods well known in the art.

Figure 4:
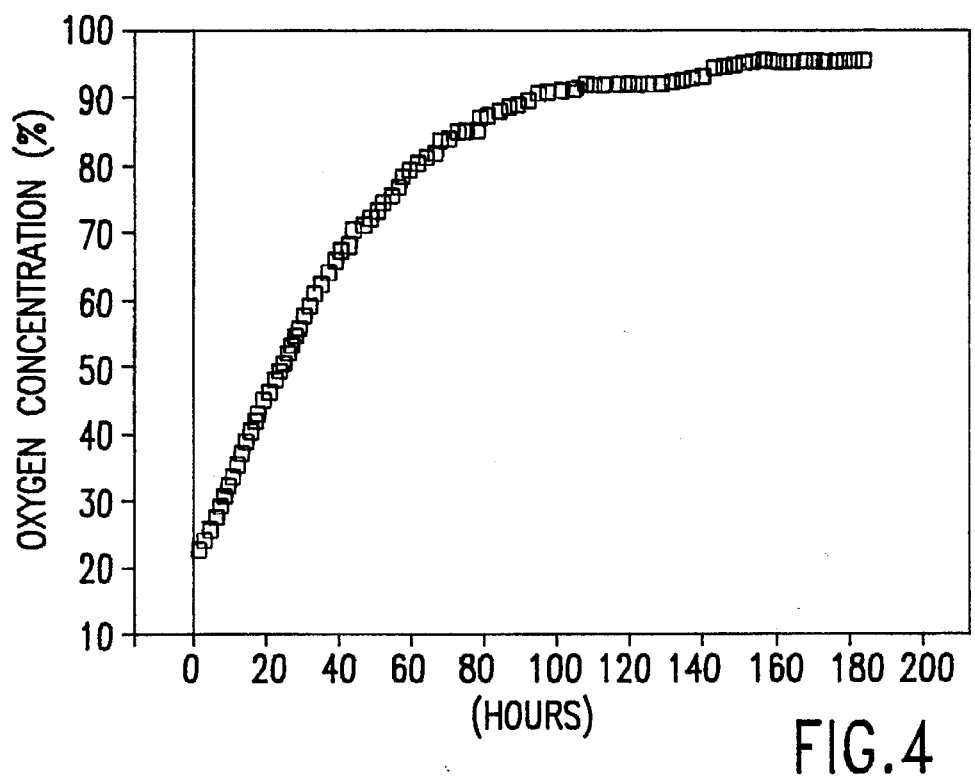
FIG. 4 is a graph showing oxygen separation using membranes according to this invention.

FIG. 4 shows separation of oxygen from air and equilibration of such separation with time using the apparatus shown in FIG. 3 with a mixed oxygen ion and electronic conducting membrane of non-homogeneous mixed microstructure material $(Bi_{1.5}Y_{0.5}O_{3-\delta})_{90 \ vol.}$ $(Ag)_{10 \ vol.}$ sintered to have a density of greater than 95% theoretical and fabricated to a thickness of 1730 microns. Air under 70 psi pressure was supplied to vessel 31 and mixed conducting membrane 30 was maintained at 750° C. The pressurized air contacted the outer surface of mixed conductive tube 30 while the inner surface of mixed conductive tube 30 was maintained at ambient pressure, and molecular oxygen collected through the exit of tube 30. FIG. 4 demonstrates the high efficiency of oxygen separation from air according to the present invention through a mixed conductive membrane subjected to relatively low pressure differential and at temperatures of 750° C., providing oxygen at a temperature suitable for many chemical processes, including combustion.

The mixed oxygen ion and electronic conducting membrane according to this invention may be used in catalysis of wide variety of chemical reactions involving the removal of oxygen ions from material on one side of the membrane and provision of oxygen ion to a different material of the other side of the membrane. In additional to free membranes, the membranes of this invention may be used in conjunction with other structures, such as coatings and the like for electrodes in electrochemical and electrolysis reactions. The membranes according to this invention may be coated on either or both sides with a suitable electrocatalyst to aid in the desired electrochemical reactions. For example, a thin coating of a catalyst for oxygen reduction as known to the art may be applied to the side of the membrane in contact with compressed air and a thin coating of a catalyst for oxygen evolution or fuel oxidation may be applied to the opposite side to enhance a desired oxidative chemical reaction in the presence of a chemical reactant. Contacting the faces of the membrane with the desired gas reactants may be achieved in any manner known to the art for contacting each side of the membrane with a different gas.

The following examples are set forth with specific materials and process conditions to specifically exemplify the invention and should not limit the invention in any way.

EXAMPLE I

A physically mixed microstructure ionic-electronic conductive composite material according to this invention having the formula $(Bi_{1.5}Er_{0.5}O_3)_{90 \ mol}$ $(Bi_2CuO_4)_{10 \ mol}$ was fabricated using 74.17 mol % (83.73 weight %) $Bi_2O_3$ powder having a particle size of 1 to 40 m, 99.99% $Bi_2O_3$, Aldrich, Milwaukee, Wisconsin; 22.50 mol % (14.88 weight %) $Er_2O_3$ powder, 99.99% $Er_2O_3$, Aldrich, Milwaukee, Wisconsin; and 3.33 mol % (1.38 weight %) $Cu_2O$ powder, 99% $Cu_2O$, Aldrich, Milwaukee, Wisconsin. The powders were ground with 2 weight % commercial disperser (Colloid #261, Rhone-Poulenc, Marietta, Georgia) in an attrition mill for 24 hours in a methanol solution. In addition, 1.5 weight % of a commercial organic binder (XUS, Dow Chemical U.S.A., Freeport, Texas) was added to the slurry during the last hour of milling. The slurry was air dried at 70° C. and then passed through a sieve with a mesh size of 200 μm. The powder was isostatically pressed for 30 seconds at a pressure of 30,000 psi. The green density was 60% of the theoretical density. The materials were densified by sintering in air at 830° C. for 4 hours. The temperature was then raised to 920° C. for 40 hours to develop a continuous second phase formed in the grain boundaries of the first phase. The finished plates had a diameter of 25 mm and a thickness of 1.5 to 2.5 mm.

Prior to carrying out electrical and electrochemical measurements, silver paste (99.9%, Heraeus Cermall, West Cmshohocken, Pa.) was applied to the surfaces of the plates and heated to 70° C. for 1 hour to remove organic solvents in the paste and the temperature then raised to 750° C. at a ramp rate of 100° C. per hour and held at 750° C. for 2 hours to burn organic binders out of the paste.

EXAMPLE II

The following ten mixed ionic-electronic conducting composite materials were fabricated:

A. $(Bi_{1.5}Y_{0.5}O_3)_{99 \ mol}$ $(Bi_2CuO_4)_{1\ mol}$
B. $(Bi_{1.5}Y_{0.5}O_3)_{97\ mol}$
   $(Bi_2CuO_4)_{3\ mol}$
C. $(Bi_{1.5}Y_{0.5}O_3)_{95\ mol}$
   $(Bi_2CuO_4)_{5\ mol}$
D. $(Bi_{1.5}Y_{0.5}O_3)_{93\ mol}$
   $(Bi_2CuO_4)_{7\ mol}$
E. $(Bi_{1.5}Y_{0.5}O_3)_{90\ mol}$
   $(Bi_2CuO_4)_{10\ mol}$
F. $(Bi_{1.5}Y_{0.5}O_3)_{85\ mol}$
   $(Bi_2CuO_4)_{15\ mol}$
G. $(Bi_{1.5}Y_{0.5}O_3)_{80\ mol}$
   $(Bi_2CuO_4)_{20\ mol}$
H. $(Bi_{1.5}Y_{0.5}O_3)_{70\ mol}$
   $(Bi_2CuO_4)_{30\ mol}$
I. $(Bi_{1.5}Y_{0.5}O_3)_{60\ mol}$
   $(Bi_2CuO_4)_{40\ mol}$
J. $(Bi_{1.5}Y_{0.5}O_3)_{50\ mol}$
   $(Bi_2CuO_4)_{50\ mol}$ Metal oxides were ground in the desired mole ratio, as shown in Table 1, for 24 hours in an attrition mill in the presence of methanol and treated as described in Example I to obtain green composite bodies having diameters of 24 to 26 mm and thicknesses of 1.5 to 2.5 mm.

TABLE 1

| Sample | $Bi_2O_3$ mol % | (wgt %) | $Y_2O_3$ mol % | (wgt %) | $Cu_2O$ mol % | (Wgt %) |
|---|---|---|---|---|---|---|
| A | 74.92 | 86.10 | 24.75 | 13.78 | 0.33 | 0.12 |
| B | 74.75 | 86.11 | 24.25 | 13.54 | 1.00 | 0.35 |
| C | 74.59 | 86.12 | 23.74 | 13.29 | 1.67 | 0.59 |
| D | 74.42 | 86.13 | 23.25 | 13.04 | 2.33 | 0.83 |
| E | 74.17 | 86.15 | 22.50 | 12.67 | 3.33 | 1.18 |
| F | 73.76 | 86.17 | 21.24 | 12.03 | 5.00 | 1.80 |
| G | 73.34 | 86.20 | 20.00 | 11.39 | 6.66 | 2.41 |
| H | 72.51 | 86.26 | 17.50 | 10.09 | 9.99 | 3.65 |
| I | 71.68 | 86.32 | 15.00 | 8.75 | 13.32 | 4.93 |
| J | 70.80 | 86.54 | 12.50 | 7.30 | 16.65 | 6.16 |

Figure 5:
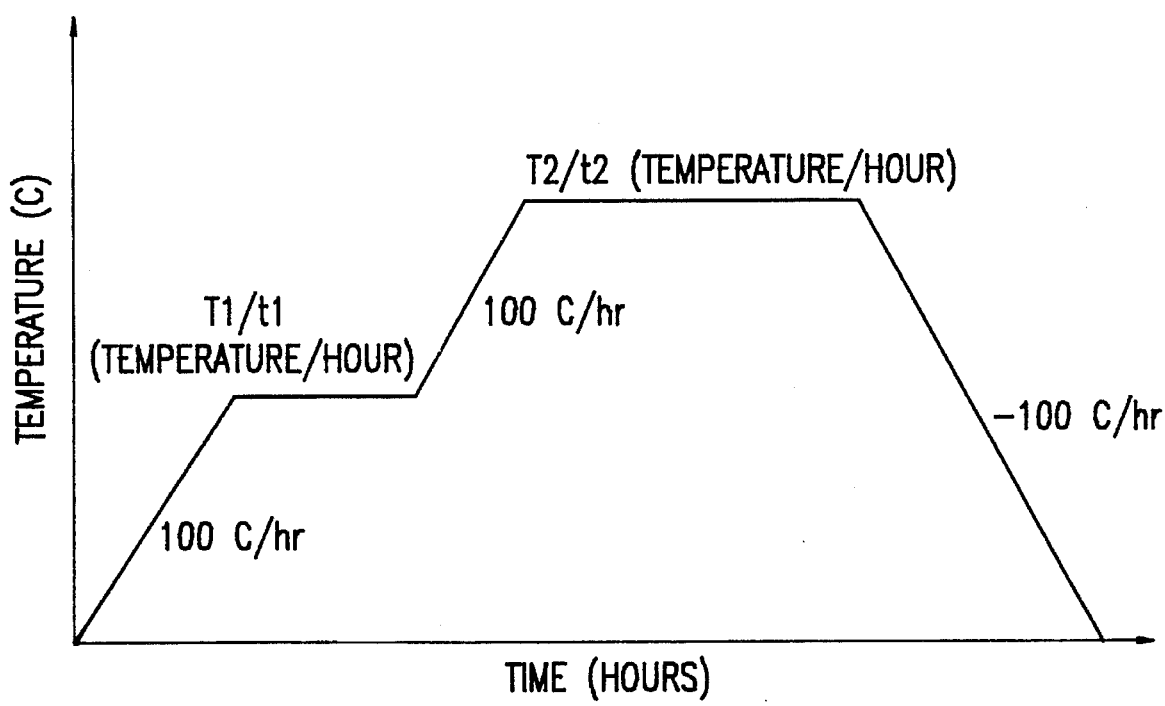
FIG. 5 shows the firing schedule of the samples in Example II.

The green samples A–J were fired according to the firing schedule shown in FIG. 5 at the temperatures and times shown in Table 2. The densities of the composite bodies were measured by the Archimedes method. The phases of the formed composite bodies were analyzed by X-ray powder diffraction and the microstructure analyzed by scanning electron microscope coupled with X-ray mapping. The theoretical densities were calculated from the measured X-ray diffraction patterns and are shown with measured densities in Table 2.

TABLE 2

| Sample | $T_1/t_1$ °C./hr | $T_2/t_2$ °C./hr | Density g/cm³ Theoretical | Measured |
|---|---|---|---|---|
| A | 840/4 | 950/40 | 8.304 | 8.10 |
| B | 840/4 | 950/40 | 8.312 | 8.06 |
| C | 840/4 | 950/40 | 8.320 | 7.85 |
| D | 830/4 | 930/40 | 8.328 | 7.81 |
| E | 830/4 | 920/40 | 8.340 | 7.80 |
| F | 830/4 | 890/20 | 8.360 | 7.82 |
| G | 820/4 | 870/20 | 8.379 | 7.78 |
| H | 820/4 | 850/20 | 8.417 | 7.76 |
| I | 800/4 | 830/20 | 8.454 | 7.75 |
| J | 800/4 | 830/20 | 8.490 | 7.70 |

Chemical compositions of both phases of Sample E were obtained by wavelength dispersion spectroscopy microprobe analysis and are summarized in Table 3.

TABLE 3

| Element | K i.X./i.std. | K ratio | Concentration wgt. % | Norm. atm. % |
|---|---|---|---|---|
| IONIC CONDUCTIVE PHASE | | | | |
| Y | 0.3012 | 0.1028 | 10.837 | 9.879 |
| Cu | 0.0013 | 0.0011 | 0.088 | 0.19 |
| Bi | 0.7789 | 0.6705 | 77.396 | 30.00 |
| O | 0.1305 | 0.1231 | 9.357 | 59.97 |
| Totals | | 0.8975 | 97.677 | 100.03 |
| ELECTRONIC CONDUCTIVE PHASE | | | | |
| Y | 0.0046 | 0.0022 | 0.253 | 0.24 |
| Bi | 0.8043 | 0.6924 | 75.807 | 30.77 |
| Cu | 0.1473 | 0.1260 | 10.569 | 14.11 |
| O | 0.1453 | 0.1092 | 10.254 | 54.36 |
| Ag | 0.0000 | 0.0000 | 0.000 | 0.00 |
| Ti | 0.0000 | 0.0000 | 0.000 | 0.00 |
| Totals | | | 97.052 | 99.48 |

Figure 6:
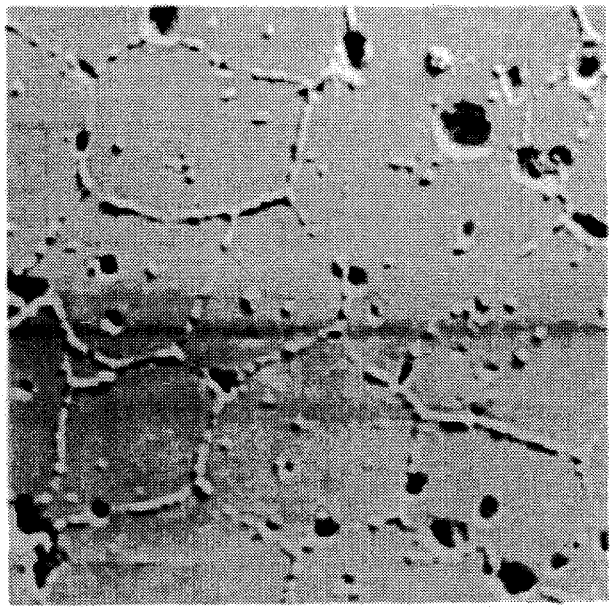
FIG. 6 is an absorption electron image of sample E of Example II.
Figure 7:
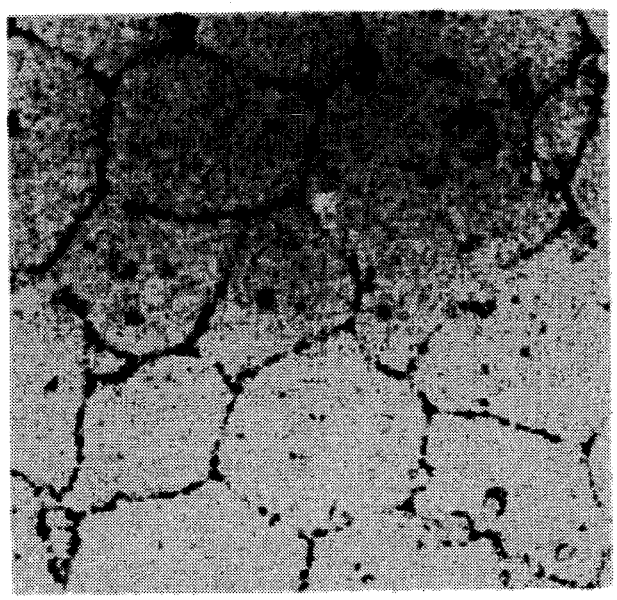
FIG. 7 is an yttrium X-ray dot mapping image of sample E of Example II.
Figure 8:
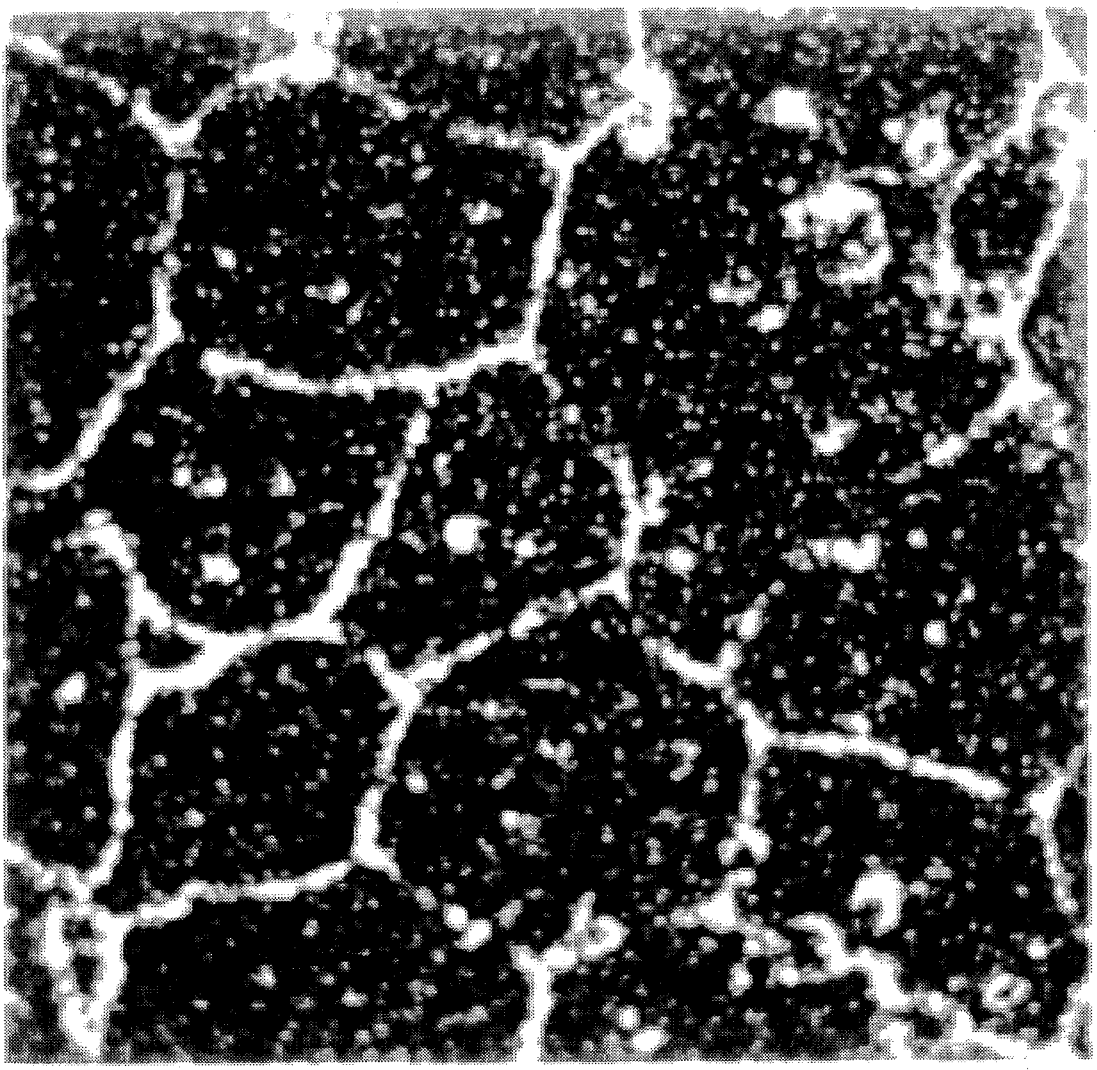
FIG. 8 is a copper X-ray dot mapping image of sample E of Example II.
Figure 9:
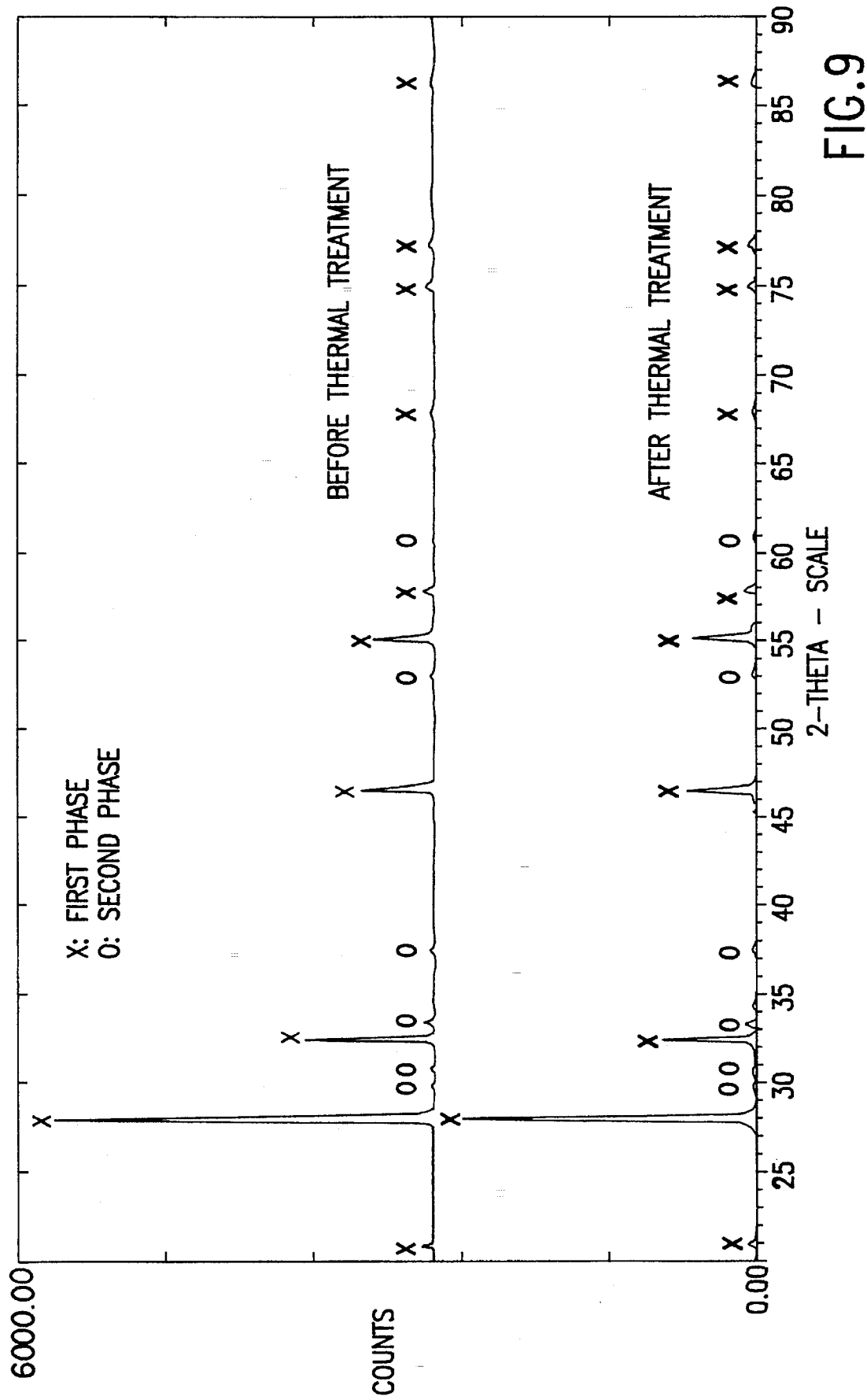
FIG. 9 is a X-ray diffraction pattern of sample E of Example II.

FIGS. 6–8 show a typical microstructure of Sample E obtained by scanning electron microscope coupled with X-ray mapping. The sample was polished to submicron finish and thermally etched at a ramp rate 20°C./min, dwell time 0.5 hour at 725° C. Other samples according to the present invention have shown similar morphology as this sample. Specifically, FIG. 6 is an absorption electron image of sample E; FIG. 7 is a yttrium X-ray dot mapping image of sample E showing the yttrium-rich ionic conducting phase surrounded by the electronic conducting phase; and FIG. 8 is a copper X-ray dot mapping image of sample E showing the copper-rich electron conducting phase around the boundaries of the grains of the yttrium-rich ionic-conducting phase. FIG. 9 is an X-ray diffraction pattern of sample E before and after being thermally treated in air at 750° C. for six weeks. The X-ray diffraction pattern was scanned at room temperature at a 2°/min speed(Cu, K$\alpha$). The X-ray diffraction patterns of other samples of Example II and Example I are similar to FIG. 9.

The impedance was measured using a Schlumberger 1260 impedance/gain phase analyzer at a frequency range between $1\times10^{-3}$ and $3.2\times10^7$ Hz. Oxygen permeation rate was measured using an oxygen concentration cell according to the method described in M. Liu and A. Joshi, (1991), supra, and in the parent application, now allowed, and incorporated herein by reference.

Figure 10:
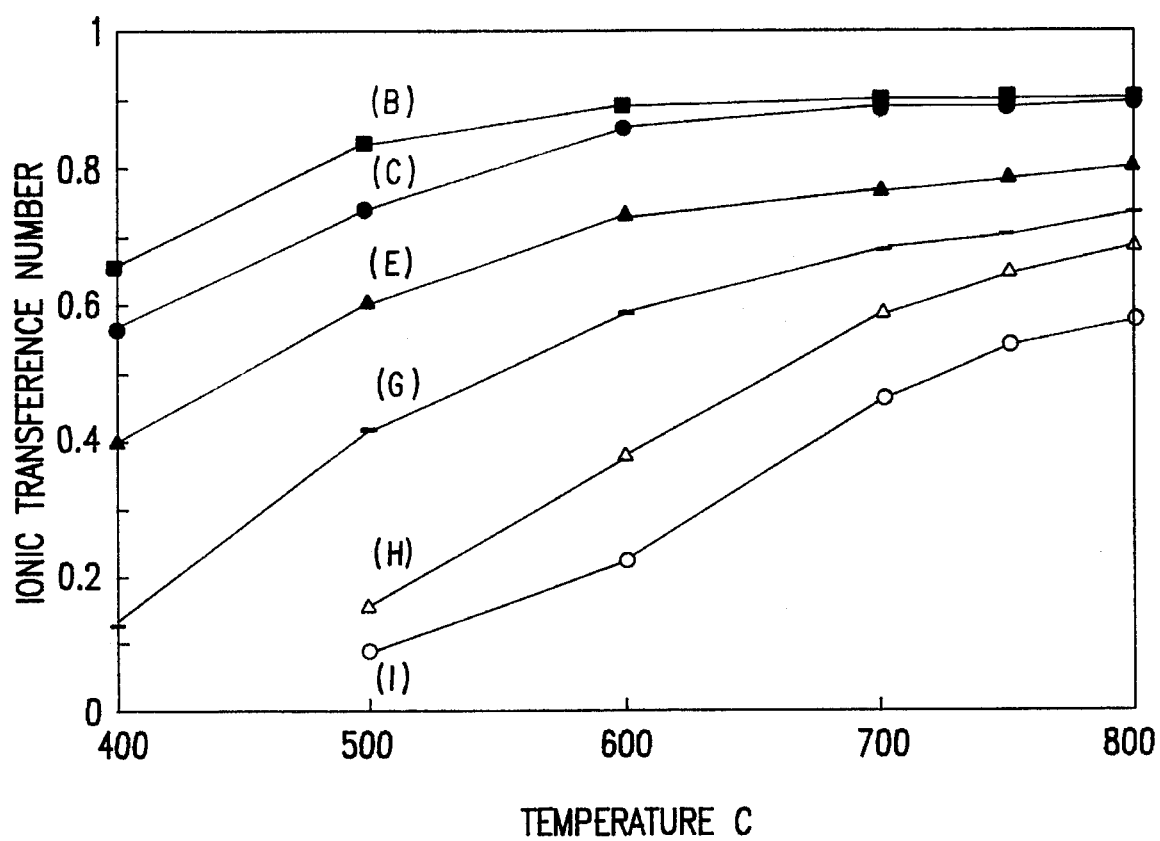
FIG. 10 is a graph of ionic transference number vs temperature of specified samples of Example II.

FIG. 10 shows the oxygen ionic transference number of samples B, C, E, G, H and I at the noted temperatures.

Figure 11:
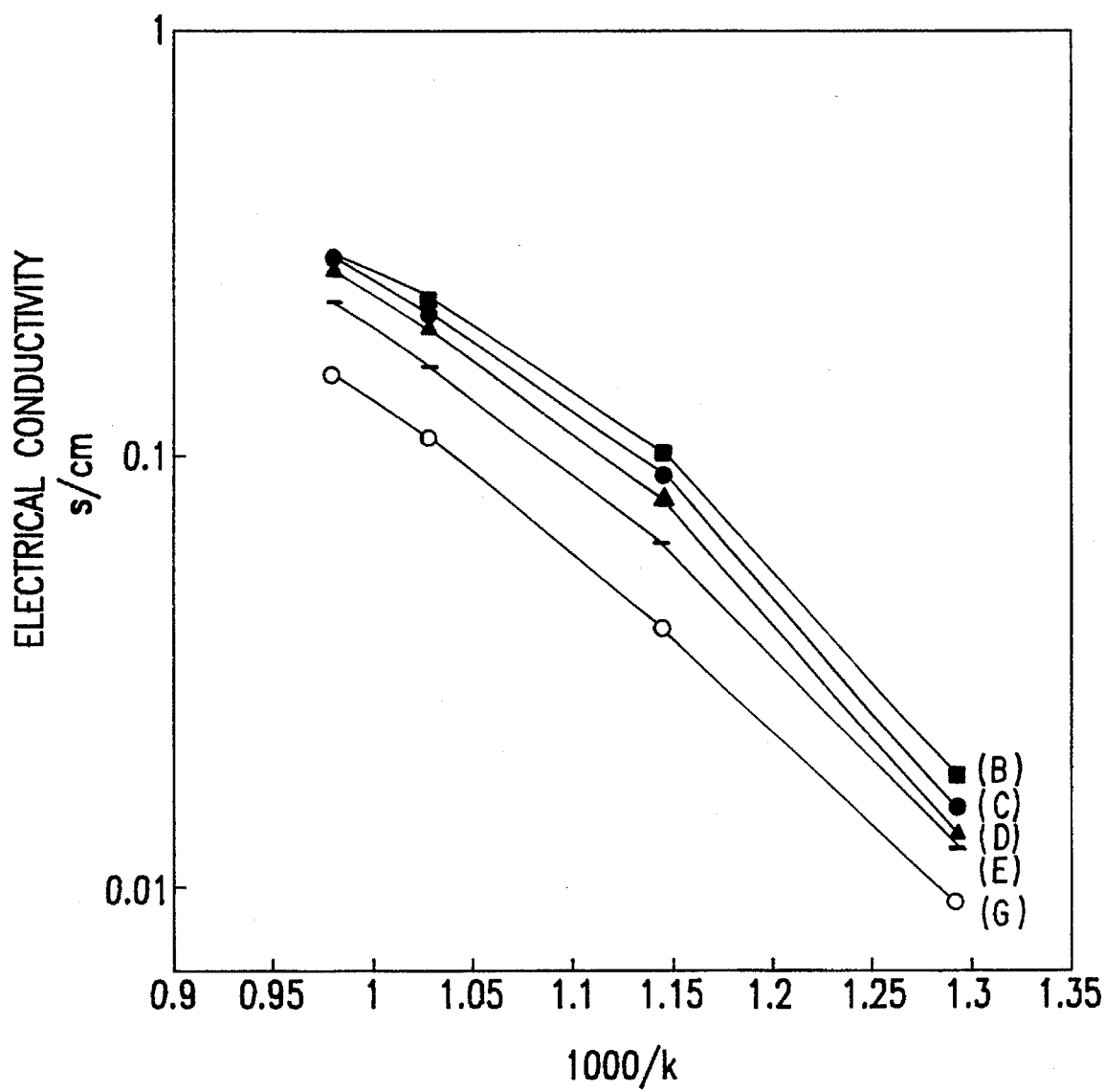
FIG. 11 is a graph of electrical conductivity of specified samples of Example II.

FIG. 11 shows the total electrical conductivity measurements in air of samples B, C, D, E and G.

Figure 12:
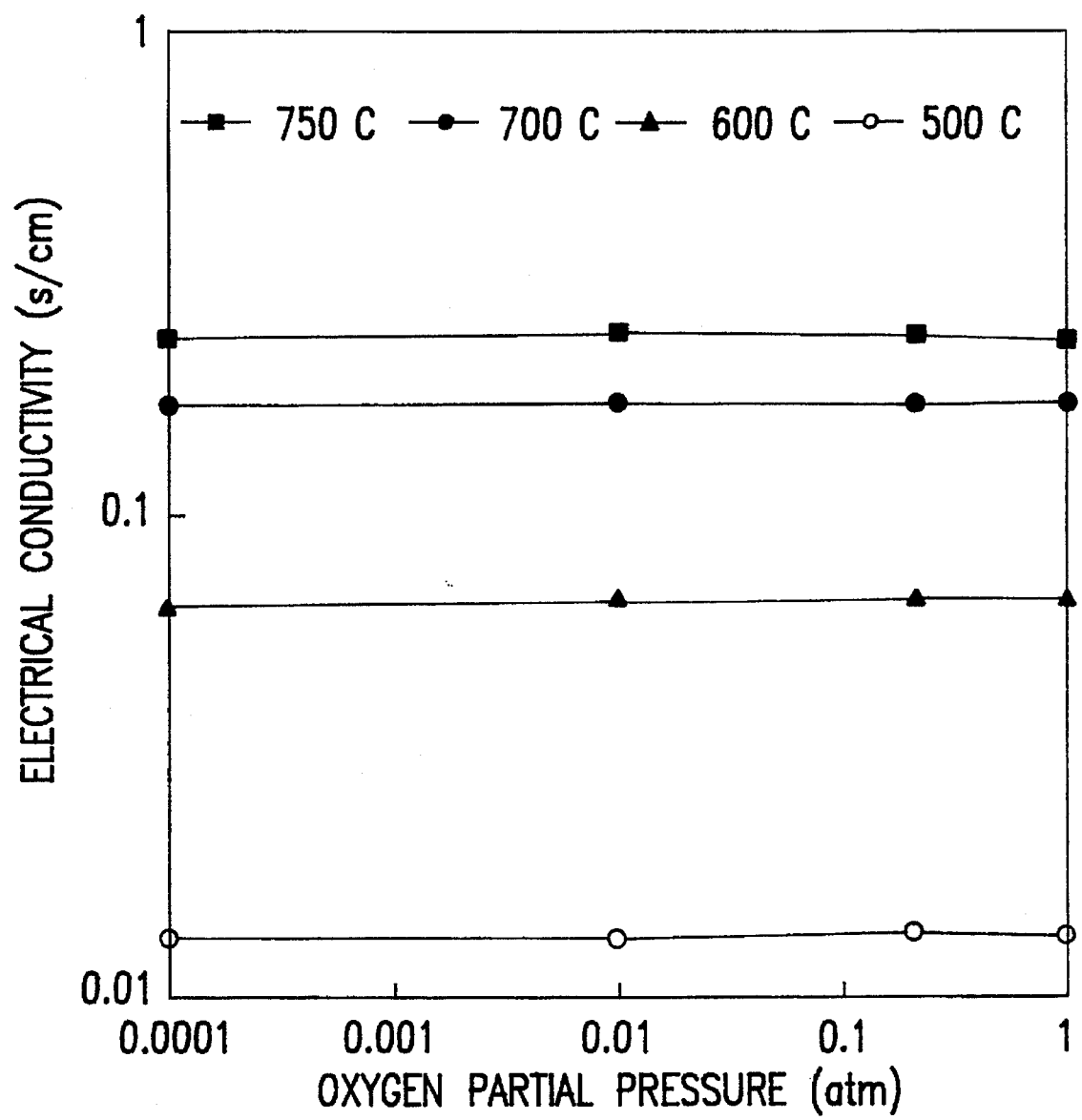
FIG. 12 is a graph of electrical conductivity vs oxygen partial pressure of sample E of Example II.

FIG. 12 shows the total electrical conductivity of sample E as a function of oxygen partial pressures indicated. Within the limits of the measurements, the results show electrical conductivity to be independent of oxygen partial pressures from $10^{-4}$ to 1 atmosphere.

Figure 13:
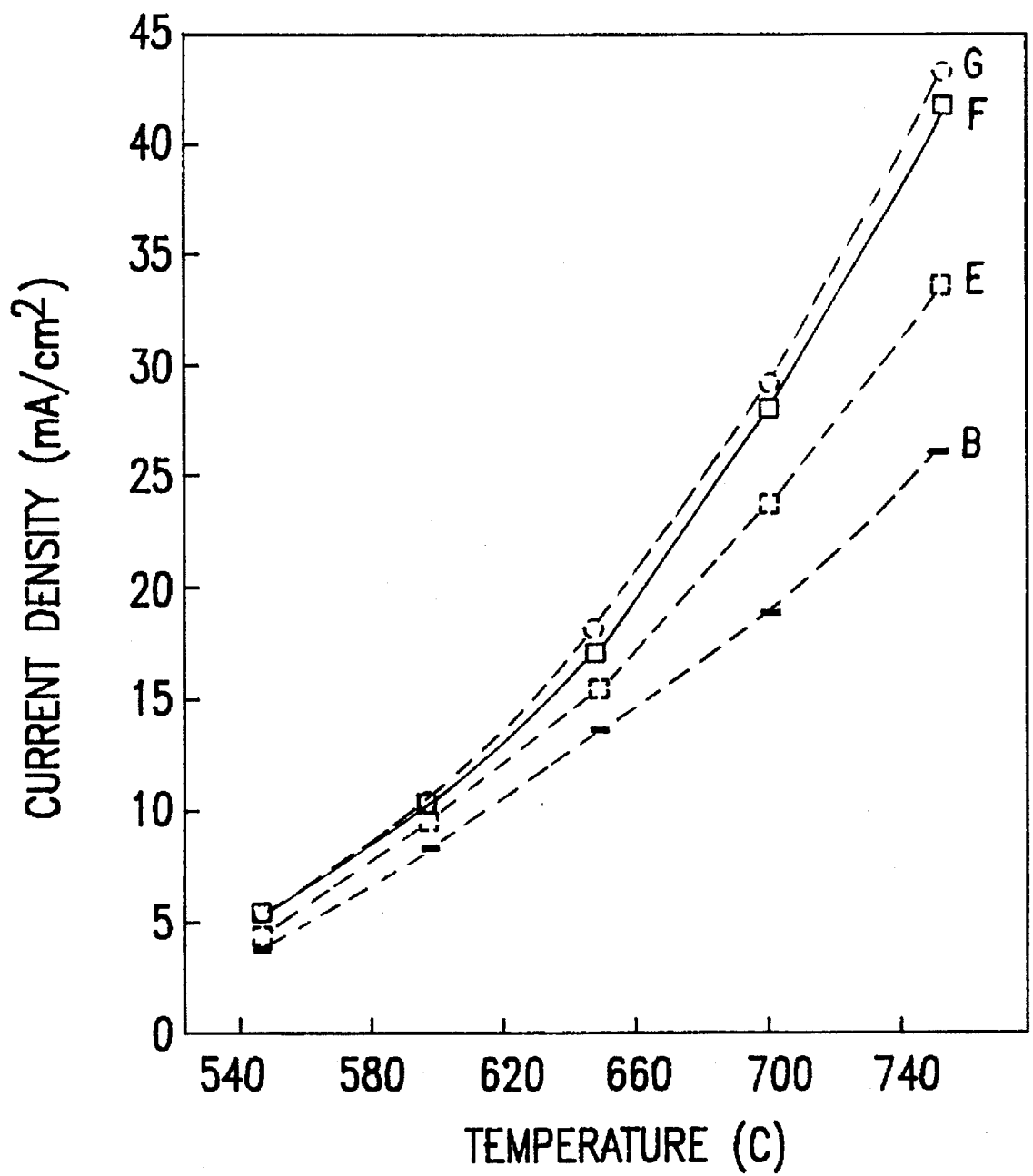
FIG. 13 is a graph of current density vs temperature using specified samples of Example II as an electrolyte in a oxygen concentration cell.

FIG. 13 shows oxygen permeation of samples B, E, F and G by the current densities obtained at specified temperatures in the range of 550° C. to 750° C. in an oxygen concentration cell having the configuration:

$$O_2(P_{O2}=0.21 atm), Ag/sample/Ag, O_2(P_{O2}=10^{-4} atm)$$

The sample electrolyte had a thickness of 2.0 mm.

EXAMPLE III

A non-homogeneous mixed microstructure material having the formula $(Bi_{1.5}Y_{0.5}O_{3-\delta})_{90\ vol}$ $(Ag)_{10\ vol}$ was prepared by first preparing yttria stabilized bismuth oxides by mixing oxide of bismuth and oxide of yttrium in the desired proportions and calcining the mixture at 800° C. for 10 hours. After the desired phase or crystal structure was obtained and verified by x-ray diffraction, the calcined powder was mixed with the desired amount of $Ag_2O$ powder and ball milled for 24 hours to a particle size of 0.5 to 1 micron. One percent binder was added to a slurry of the powder mixture which was milled for an additional hour and then dried on a hot plate or a dry oven, screened, formed into pellets or other desired forms, as described in Example I, and then the green parts were fired at 950° C. for 5 hours in air to achieve density of greater than 95% of the theoretical value.

FIG. 14 is a photomicrograph at 800× of $(Bi_{1.5}Y_{0.5}O_{3-\delta})_{90\ vol}$ $(Ag)_{10\ vol}$ as prepared in this Example showing the non-homogeneous mixed microstructure matrix $Bi_{1.5}Y_{0.5}O_{3-\delta}$ phase as black and the Ag phase as white.

While in the foregoing specification, this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

We claim:

1. A composite mixed oxygen ion-electronic conductor having a non-homogeneous mixed microstructure comprising about 5 to about 95 volume percent oxygen ion conducting phase having grain boundaries and selected from the group consisting of $Bi_{2-x-y}M'_xM_yO_{3-\delta}$, $Ce_{2-x-y}M'_xM_yO_{2-\delta}$, and $Th_{2-x-y}M'_xM_yO_{2-\delta}$ wherein M' is a stabilizer selected from the group consisting of Er, Y, Tm, Yb, Lu, Nd, Sm, Dy, Zr, Hf, Th, Ta, Nb, Pb, Sn, In, and mixtures thereof, M is a dopant selected from the group consisting of Cu, Ti, V, Cr, Mn, Fe, Co, Ni, and mixtures thereof, x is a positive number of about 0.10 to about 0.30, y is a number of 0 to about 0.30, and $\delta$ is a number to satisfy valence requirements and about 5 to about 95 volume percent of a substantially continuous predominantly electronic conducting phase selected from the group consisting of at least one metal selected from the group consisting of Ag, Ir, Pd, Pt and Au, an electronically conductive metal oxide of $CrO_2$, $IrO_2$, $MnO_2$, $MoO_2$, $OsO_2$, $ReO_2$, $RhO_2$, $RuO_2$, $WO_2$, $VO_2$, $Bi_{2-y}M_yO_{3-\delta}$ wherein y' is a numeral of about 0.40 to 2.0 and M and $\delta$ have the meanings defined above, and mixtures thereof, and an electronically conductive perovskite material selected from $La_{1-z}Sr_zCoO_{3-\delta}$, $La_{1-z}Sr_zMnO_{3-\delta}$, $La_{1-z}Sr_zMn_{1-w}Co_wO_{3-\delta}$, $La_{1-z}Sr_zCo_{1-w}Fe_wO_{3-\delta}$, $SrFe_{1-z}Co_zO_{3-\delta}$, $VTiO_3$, $LaTiO_3$, $SrFeO_3$, $SrRuO_3$, $LaNi_{1-z}Co_zO_{3-\delta}$, derivative forms and mixtures thereof wherein z is a positive numeral of about 0.01 to about 0.8, w is a positive numeral of about 0.01 to about 0.8, and $\delta$ is a number to satisfy valence requirements.

2. A composite mixed oxygen ion-electronic conductor according to claim 1 wherein said oxygen ion conductor phase comprises about 50 to about 95 volume percent, M' is selected from the group consisting of Er, Y, Dy and mixtures thereof, M is selected from the group consisting of Cu, Ti, Fe and mixtures thereof, y is a number of about 0.02 to about 0.3, and said electronic conductor phase comprises about 5 to about 50 volume percent and is selected from the group consisting of at least one metal selected from Ag, Ir, Pd, Pt and Au and an electronically conductive metal oxide of $CrO_2$, $IrO_2$, $MnO_2$, $MoO_2$, $OsO_2$, $ReO_2$, $RhO_2$, $RuO_2$, $WO_2$, $VO_2$, $Bi_{2-y}M_yO_{3-\delta}$ wherein y' is a numeral of about 0.40 to about 2.0, M is selected from the group consisting of Cu, Ti, Fe and mixtures thereof and $\delta$ is a number to satisfy valence requirements.

3. Mixed oxygen ion and electronic conducting bismuth oxide based material having high ambipolar conductivity of a non-homogeneous mixed microstructure material having about 50 to about 95 volume percent of a continuous oxygen ion conducting bismuth oxide based phase having the chemical formulation $Bi_{2-x-y}M'_xM_yO_{3-\delta}$ wherein M' is a stabilizer selected from the group consisting of Er, Y, Tm, Yb, Lu, Nd, Sm, Dy, Zr, Hf, Th, Ta, Nb, Pb, Sn, In, and mixtures thereof, M is a dopant selected from the group consisting of Cu, Ti, V, Cr, Mn, Fe, Co, Ni, and mixtures thereof, x is a positive number of about 0.10 to about 0.30, y is a number of 0 to about 0.30, and $\delta$ is a number to satisfy valence requirements and a substantially continuous electronic conducting phase of about 5 to about 50 volume percent selected from the group consisting of at least one metal, metal oxide of at least one metal, at least one perovskite type material and mixtures thereof electronically conductive and chemically inert to said oxygen ion conducting bismuth oxide based phase.

4. Mixed oxygen ion and electronic conducting material according to claim 3 wherein M is selected from the group consisting of Cu, Ti, Fe and mixtures thereof.

5. Mixed oxygen ion and electronic conducting material according to claim 3 wherein M' is selected from the group consisting of Er, Y, Dy and mixtures thereof.

6. Mixed oxygen ion and electronic conducting material according to claim 3 wherein x is about 0.2 to about 0.5 and y is about 0.02 to about 0.3.

7. Mixed oxygen ion and electronic conducting material according to claim 3 wherein said electronic conducting phase is at least one metal selected from the group consisting of Ag, Ir, Pd, Pt and Au.

8. Mixed oxygen ion and electronic conducting material according to claim 3 wherein said electronic conducting phase is an electronically conductive metal oxide selected from the group consisting of $CrO_2$, $IrO_2$, $MnO_2$, $MoO_2$, $OsO_2$, $ReO_2$, $RhO_2$, $RuO_2$, $WO_2$, $VO_2$, $Bi_{2-y}M_yO_{3-\delta}$ wherein y' is a numeral of about 0.40 to about 2.0, M is selected from the group consisting of Cu, Ti, Fe and mixtures thereof and $\delta$ is a number to satisfy valence requirements.

9. Mixed oxygen ion and electronic conducting material according to claim 4 wherein said electronic conducting phase is an electronically conductive perovskite material selected from the group consisting of $La_{1-z}Sr_zCoO_{3-\delta}$, $La_{1-z}Sr_zMnO_{3-\delta}$, $La_{1-z}Sr_zMn_{1-w}Co_wO_{3-\delta}$, $La_{1-z}Sr_zCo_{1-w}Fe_wO_{3-\delta}$, $SrFe_{1-z}Co_zO_{3-\delta}$, $VTiO_3$, $LaTiO_3$, $SrFeO_3$, $SrRuO_3$, $LaNi_{1-z}Co_zO_{3-\delta}$, derivative forms and mixtures thereof wherein z is a positive numeral of about 0.01 to about 0.8; w is a positive numeral of about 0.01 to about 0.8; and $\delta$ is a number to satisfy valence requirements.

10. Mixed oxygen ion and electronic conducting material according to claim 3 wherein said electronic conducting phase is $Bi_{2-y}M_yO_{3-\delta}$ wherein M is selected from the group consisting of Cu, Ti, Fe and mixtures thereof and y' is about 0.40 to about 1.0, said electronic conducting phase located at the grain boundaries of said oxygen ion conducting phase.

11. Mixed oxygen ion and electronic conducting bismuth oxide based material having high ambipolar conductivity of a non-homogeneous mixed microstructure material selected from the group consisting of: about 30 to about 99 mole percent of an oxygen ion conducting bismuth oxide based phase having grain boundaries and having the chemical formulation $Bi_{2-x-y}M'_xM_yO_{3-\delta}$ wherein M' is a stabilizer selected from the group consisting of Er, Y, Tm, Yb, Lu, Nd, Sm, Dy, Zr, Hf, Th, Ta, Nb, Pb, Sn, In, and mixtures thereof, M is a dopant selected from the group consisting of Cu, Ti, V, Cr, Mn, Fe, Co, Ni, and mixtures thereof, x is a positive number of about 0.10 to about 0.30, y is a number of 0 to about 0.10, and $\delta$ is a number to satisfy valence requirements and about 1 to about 70 mole percent of a substantially continuous electronic conducting phase selected from the group consisting of metal oxide of at least one metal, at least one perovskite type material and mixtures thereof electronically conductive and chemically inert to said oxygen ion conducting bismuth oxide based phase; and about 50 to about 95 volume percent said oxygen ion conducting bismuth oxide phase and about 5 to about 50 volume percent of predominantly electronic conductive phase of at least one metal selected from the group consisting of Ag, Ir, Pd, Pt and Au.

12. Mixed oxygen ion and electronic conducting material according to claim 11 wherein said oxygen ion conducting bismuth oxide phase is present in about 60 to about 95 mole percent, M' is selected from the group consisting of Er, Y and Dy and M is selected from the group consisting of Cu, Ti and Fe; said electronic conducting phase is present in about 5 to about 40 mole percent and is a metal oxide selected from the group consisting of $CrO_2$, $IrO_2$, $MnO_2$, $MoO_2$, $OsO_2$, $ReO_2$, $RhO_2$, $RuO_2$, $WO_2$, $VO_2$, $Bi_{2-y}M_yO_{3-\delta}$ wherein y' is a numeral of about 0.40 to about 2.0, M is selected from the group consisting of Cu, Ti, Fe and mixtures thereof and $\delta$ is a number to satisfy valence requirements.

13. Mixed oxygen ion and electronic conducting material according to claim 12 wherein said electronic conducting phase is said $Bi_{2-y}M_yO_{3-\delta}$ and said electronic conducting phase is located at the grain boundaries of said oxygen ion conducting phase.

14. Mixed oxygen ion and electronic conducting material according to claim 11 wherein said oxygen ion conducting bismuth oxide phase is present in about 70 to about 80 volume percent, M' is selected from the group consisting of Er, Y and Dy and M is selected from the group consisting of Cu, Ti and Fe; said electronic conducting phase is present in about 20 to about 30 volume percent and is at least one metal selected from the group consisting of Ag, Ir, Pd, Pt and Au.

15. A mixed oxygen ion and electronic conducting gas impervious membrane having high ambipolar conductivity for oxygen ion transport having a non-homogeneous mixed microstructure comprising about 5 to about 95 volume percent oxygen ion conductor phase is selected from the group consisting of $Bi_{2-x-y}M'_xM_yO_{3-\delta}$, $Ce_{2-x-y}M'_xM_yO_{2-\delta}$, and $Th_{2-x-y}M'_xM_yO_{2-\delta}$ wherein M' is a stabilizer selected from the group consisting of Er, Y, Tm, Yb, Lu, Nd, Sm, Dy, Zr, Hf, Th, Ta, Nb, Pb, Sn, In, and mixtures thereof, M is a dopant selected from the group consisting of Cu, Ti, V, Cr, Mn, Fe, Co, Ni, and mixtures thereof, x is a positive number of about 0.10 to about 0.30, y is a number of 0 to about 0.30, and $\delta$ is a number to satisfy valence requirements and about 5 to about 95 volume percent of a substantially continuous electronic conducting phase selected from the group consisting of at least one metal selected from the group consisting of Ag, Ir, Pd, Pt and Au, an electronically conductive metal oxide of $CrO_2$, $IrO_2$, $MnO_2$, $MoO_2$, $OsO_2$, $ReO_2$, $RhO_2$, $RuO_2$, $WO_2$, $VO_2$, $Bi_{2-y}M_yO_{3-\delta}$, wherein y' is a numeral of about 0.40 to 2.0 and M and $\delta$ have the meanings defined above, and mixtures thereof, and an electronically conductive perovskite material selected from $La_{1-z}Sr_zCoO_{3-\delta}$, $La_{1-z}Sr_zMnO_{3-\delta}$, $La_{1-z}Sr_zMn_{1-w}Co_wO_{3-\delta}$, $La_{1-z}Sr_zCo_{1-w}Fe_wO_{3-\delta}$, $SrFe_{1-z}Co_zO_{3-\delta}$, $VTiO_3$, $LaTiO_3$, $SrFeO_3$, $SrRuO_3$, $LaNi_{1-z}Co_zO_{3-\delta}$, derivative forms and mixtures thereof wherein z is a positive numeral of about 0.01 to about 0.8, w is a positive numeral of about 0.01 to about 0.8, and $\delta$ is a number to satisfy valence requirements.

16. A mixed oxygen ion and electronic conducting gas impervious membrane according to claim 15 having a thickness of about 1 micron to about 2000 microns.

17. A mixed oxygen ion and electronic conducting gas impervious membrane according to claim 15 having a thickness of about 1 micron to about 50 microns.

18. A mixed oxygen ion and electronic conducting gas impervious membrane according to claim 15 wherein M is selected from the group consisting of Cu, Ti, Fe and mixtures thereof, M' is selected from the group consisting of Er, Y, Dy and mixtures thereof, x is about 0.2 to about 0.5 and y is about 0.02 to about 0.3.

19. A mixed oxygen ion and electronic conducting gas impervious membrane according to claim 15 wherein said electronic conducting phase is at least one metal selected from the group consisting of Ag, Ir, Pd, Pt and Au.

20. A mixed oxygen ion and electronic conducting gas impervious membrane according to claim 15 wherein said electronic conducting phase is an electronically conductive metal oxide selected from the group consisting of $CrO_2$, $IrO_2$, $MnO_2$, $MoO_2$, $OSO_2$, $ReO_2$, $RhO_2$, $RuO_2$, $WO_2$, $VO_2$ and $Bi_{x-y}M_yO_{3-\delta}$ wherein y' is a numeral of about 0.40 to about 2.0, M is selected from the group consisting of Cu, Ti, Fe and mixtures thereof and $\delta$ is a number to satisfy valence requirements.

21. A mixed oxygen ion and electronic conducting gas impervious membrane according to claim 15 wherein said electronic conducting phase is an electronically conductive perovskite material selected from the group consisting of $La_{1-z}Sr_zCoO_{3-\delta}$, $La_{1-z}Sr_zMnO_{3-\delta}$, $La_{1-z}Sr_zMn_{1-w}Co_wO_{3-\delta}$, $La_{1-z}Sr_zCo_{1-w}Fe_wO_{3-\delta}$, $SrFe_{1-z}Co_zO_{3-\delta}$, $VTiO_3$, $LaTiO_3$, $SrFeO_3$, $SrRuO_3$, $LaNi_{1-z}Co_zO_{3-\delta}$, derivative forms and mixtures thereof wherein z is a positive numeral of about 0.01 to about 0.8; w is a positive numeral of about 0.01 to about 0.8; and $\delta$ is a number to satisfy valence requirements.

22. A mixed oxygen ion and electronic conducting gas impervious membrane according to claim 15 wherein said electronic conducting phase is $Bi_{s-y}M_yO_{3-\delta}$ wherein M is selected from the group consisting of Cu, Ti, Fe and mixtures thereof and y' is about 0.40 to about 1.0.

23. A mixed oxygen ion and electronic conducting gas impervious bismuth oxide based membrane having a thickness of about 1 to about 50 microns with high ambipolar conductivity comprising a non-homogeneous mixed microstructure material selected from the group consisting of: about 30 to about 99 mole percent of an oxygen ion conducting bismuth oxide based phase having the chemical formulation $Bi_{2-x-y}M'_xM_yO_{3-\delta}$ wherein M' is a stabilizer selected from the group consisting of Er, Y, Tm, Yb, Lu, Nd, Sm, Dy, Zr, Hf, Th, Ta, Nb, Pb, Sn, In, and mixtures thereof, M is a dopant selected from the group consisting of Cu, Ti, Vn, Cr, Mn, Fe, Co, Ni, and mixtures thereof, x is a positive number of about 0.10 to about 0.30, y is a number of 0 to about 0.30, and $\delta$ is a number to satisfy valence requirements and about 1 to about 70 mole percent of a substantially continuous electronic conducting phase percent selected from the group consisting of metal oxide of at least one metal, at least one perovskite material and mixtures thereof electronically conductive and chemically inert to said oxygen ion conducting bismuth oxide based phase; and about 50 to about 95 volume percent said oxygen ion conducting bismuth oxide phase and about 5 to about 50 volume percent of the electronic conductive phase of at least one metal selected from the group consisting of Ag, Ir, Pd, Pt and Au.

24. A process for oxygen separation from an oxygen containing gas comprising contacting a first side of a gas impermeable mixed oxygen ion and electronic conducting membrane with said oxygen containing gas at an elevated pressure concurrently with contacting a second opposite side of said membrane with gas at a lower pressure than said oxygen containing gas withdrawing oxygen ions from said second opposite side of said membrane, said mixed oxygen ion and electronic conducting membrane with high ambipolar conductivity for oxygen ion transport having a non-homogeneous mixed microstructure comprising about 5 to about 95 volume percent predominantly oxygen ion conductor phase is selected from the group consisting of $Bi_{2-x-y}M'_xM_yO_{3-\delta}$, $Ce_{2-x-y}M'_xM_yO_{2-\delta}$, and $Th_{2-x-y}M'_xM_yO_{2-\delta}$ wherein M' is a stabilizer selected from the group consisting of Er, Y, Tm, Yb, Lu, Nd, Sm, Dy, Zr, Hf, Th, Ta, Nb, Pb, Sn, In, and mixtures thereof, M is a dopant selected from the group consisting of Cu, Ti, V, Cr, Mn, Fe, Co, Ni, and mixtures thereof, x is a positive number of about 0.10 to about 0.30, y is a number of 0 to about 0.30, and $\delta$ is a number to satisfy valence requirements and about 5 to about 95 volume percent of a substantially continuous electronic conducting phase selected from the group consisting of at least one metal selected from the group consisting of Ag, Ir, Pd, Pt and Au, an electronically conductive metal oxide of $CrO_2$, $IrO_2$, $MnO_2$, $MoO_2$, $OsO_2$, $ReO_2$, $RhO_2$, $RuO_2$, $WO_2$, $VO_2$, $Bi_{2-y}M_yO_{3-\delta}$, wherein y' is a numeral of about 0.40 to 2.0 and M and $\delta$ have the meanings defined above, and mixtures thereof, and an electronically conductive perovskite material selected from $La_{1-z}Sr_zCoO_{3-\delta}$, $La_{1-z}Sr_zMnO_{3-\delta}$, $La_{1-z}Sr_zMn_{1-w}Co_wO_{3-\delta}$, $La_{1-z}Sr_zCo_{1-w}Fe_wO_{3-\delta}$, $SrFe_{1-z}Co_zO_{3-\delta}$, $VTiO_3$, $LaTiO_3$, $SrFeO_3$, $SrRuO_3$, $LaNi_{1-z}Co_zO_{3-\delta}$, derivative forms and mixtures thereof wherein z is a positive numeral of about 0.01 to about 0.8, w is a positive numeral of about 0.01 to about 0.8, and $\delta$ is a number to satisfy valence requirements.

25. A process for oxygen separation according to claim 24 wherein M is selected from the group consisting of Cu, Ti, Fe and mixtures thereof, M' is selected from the group consisting of Er, Y, Dy and mixtures thereof, x is about 0.2 to about 0.5 and y is about 0.02 to about 0.3.

26. A process for oxygen separation according to claim 24 wherein said electronic conducting phase is at least one metal selected from the group consisting of Ag, Ir, Pd, Pt and Au.

27. A process for oxygen separation according to claim 24 wherein said electronic conducting phase is an electronically conductive metal oxide selected from the group consisting of $CrO_2$, $IrO_2$, $MnO_2$, $MoO_2$, $OsO_2$, $ReO_2$, $RhO_2$, $RuO_2$, $WO_2$, $VO_2$ and $Bi_{2-y}M_yO_{3-\delta}$ wherein y' is a numeral of about 0.40 to about 2.0, M is selected from the group consisting of Cu, Ti, Fe and mixtures thereof and $\delta$ is a number to satisfy valence requirements.

28. A process for oxygen separation according to claim 24 wherein said electronic conducting phase is an electronically conductive perovskite material selected from the group consisting of $La_{1-z}Sr_zCoO_{3-\delta}$, $La_{1-z}Sr_zMnO_{3-\delta}$, $La_{1-z}Sr_zMn_{1-w}Co_wO_{3-\delta}$, $La_{1-z}Sr_zCo_{1-w}Fe_wO_{3-\delta}$, $SrFe_{1-z}Co_zO_{3-\delta}$, $VTiO_3$, $LaTiO_3$, $SrFeO_3$, $SrRuO_3$, $LaNi_{1-z}Co_zO_{3-\delta}$, derivative forms and mixtures thereof wherein z is a positive numeral of about 0.01 to about 0.8; w is a positive numeral of about 0.01 to about 0.8; and $\delta$ is a number to satisfy valence requirements.

29. A process for oxygen separation according to claim 24 wherein said electronic conducting phase is $Bi_{2-y}M_yO_{3-\delta}$ wherein M is selected from the group consisting of Cu, Ti, Fe and mixtures thereof and y is about 0.40 to about 1.0.

30. A process for oxygen separation from an oxygen containing gas comprising contacting a first side of a gas impermeable mixed oxygen ion and electronic conducting membrane with said oxygen containing gas at an elevated pressure concurrently with contacting a second Opposite side of said membrane with gas at a lower pressure than said oxygen containing gas withdrawing oxygen ions from said second opposite side of said membrane, said mixed oxygen ion and electronic conducting membrane is a bismuth oxide based membrane having a thickness of about 1 to about 50 microns with high ambipolar conductivity comprising a non-homogeneous mixed microstructure material selected from the group consisting of: about 30 to about 99 mole percent of an oxygen ion conducting bismuth oxide based phase having the chemical formulation $Bi_{2-x-y}M'_xM_yO_{3-\delta}$ wherein M' is a stabilizer selected from the group consisting of Er, Y, Tm, Yb, Lu, Nd, Sm, Dy, Zr, Hf, Th, Ta, Nb, Pb, Sn, In, and mixtures thereof, M is a dopant selected from the group consisting of Cu, Ti, V, Cr, Mn, Fe, Co, Ni, and mixtures thereof, x is a positive number of about 0.10 to about 0.30, y is a number of 0 to about 0.30, and $\delta$ is a number to satisfy valence requirements and about 1 to about 70 mole percent of a substantially continuous electronic conducting phase percent selected from the group consisting of metal oxide of at least one metal, at least one perovskite type material and mixtures thereof electronically conductive and chemically inert to said oxygen ion conducting bismuth oxide based phase; and about 50 to about 95 volume percent said oxygen ion conducting bismuth oxide phase and about 5 to about 50 volume percent of the electronic conductive phase of at least one metal selected from the group consisting of Ag, Ir, Pd, Pt and Au.

31. A composite mixed oxygen ion-electronic conductor having a non-homogeneous mixed microstructure comprising about 5 to about 95 volume percent oxygen ion conducting phase selected from the group consisting of $Bi_{2-x-y}M'_xM_yO_{3-\delta}$, $Ce_{2-x-y}M'_xM_yO_{2-\delta}$, and $Th_{2-x-y}M'_xM_yO_{2-\delta}$ wherein M' is a stabilizer selected from the group consisting of Zr, Hf, Th, Ta, Nb, Pb, Sn, In, and mixtures thereof, M is a dopant selected from the group consisting of Cu, Cr, Mn, Fe, Co, Ni, and mixtures thereof, x is a positive number of about 0.10 to about 0.30, y is a number of 0 to about 0.30, and $\delta$ is a number to satisfy valence requirements and about 5 to about 95 volume percent of a substantially continuous electronic conducting phase selected from the group consisting of at least one metal selected from the group consisting of Ag, Ir, Pd, Pt and Au, an electronically conductive metal oxide of $CrO_2$, $IrO_2$, $MnO_2$, $MoO_2$, $OsO_2$, $ReO_2$, $RhO_2$, $RuO_2$, $WO_2$, $VO_2$, $Bi_{2-y}M_yO_{3-\delta}$ wherein y' is a numeral of about 0.40 to 2.0 and M and $\delta$ have the meanings defined above, and mixtures thereof, and an electronically conductive perovskite material selected from $La_{1-z}Sr_zCoO_{3-\delta}$, $La_{1-z}Sr_zMnO_{3-\delta}$, $La_{1-z}Sr_zMn_{1-w}Co_wO_{3-\delta}$, $La_{1-z}Sr_zCo_{1-w}Fe_wO_{3-\delta}$, $SrFe_{1-z}Co_zO_{3-\delta}$, $VTiO_3$, $LaTiO_3$, $SrFeO_3$, $SrRuO_3$, $LaNi_{1-z}Co_zO_{3-\delta}$, derivative forms and mixtures thereof wherein z is a positive numeral of about 0.01 to about 0.8, w is a positive numeral of about 0.01 to about 0.8, and $\delta$ is a number to satisfy valence requirements.

* * * * *